(12) United States Patent
Yoshida et al.

(10) Patent No.: US 12,331,842 B2
(45) Date of Patent: Jun. 17, 2025

(54) ELECTRICALLY OPERATED VALVE

(71) Applicant: FUJIKOKI CORPORATION, Tokyo (JP)

(72) Inventors: Tatsuya Yoshida, Tokyo (JP); Masaki Hiratsuka, Tokyo (JP)

(73) Assignee: FUJIKOKI CORPORATION, Tokyo (JP)

( * ) Notice: Subject to any disclaimer, the term of this patent is extended or adjusted under 35 U.S.C. 154(b) by 0 days.

(21) Appl. No.: 18/250,820

(22) PCT Filed: Sep. 7, 2022

(86) PCT No.: PCT/JP2022/033522
§ 371 (c)(1),
(2) Date: Apr. 27, 2023

(87) PCT Pub. No.: WO2023/084893
PCT Pub. Date: May 19, 2023

(65) Prior Publication Data
US 2024/0328528 A1 Oct. 3, 2024

(30) Foreign Application Priority Data

Nov. 10, 2021 (JP) .................................. 2021-183278

(51) Int. Cl.
| F16K 31/04 | (2006.01) |
| B60T 8/36 | (2006.01) |
| F16K 27/02 | (2006.01) |

(52) U.S. Cl.
CPC .......... *F16K 31/046* (2013.01); *F16K 27/029* (2013.01); *B60T 8/3675* (2013.01)

(58) Field of Classification Search
CPC ........................... F15B 13/0853; F16K 27/029
(Continued)

(56) References Cited

U.S. PATENT DOCUMENTS 6,079,798 A * 6/2000 Hosoya ................... B60T 8/368
303/DIG. 10
8,237,318 B2 * 8/2012 Ikitake ................. H02K 11/215
310/68 B
(Continued)

FOREIGN PATENT DOCUMENTS

| JP | 2007227354 A | 9/2007 |
| JP | 2021032295 A | 3/2021 |
| JP | 2021110409 A | 8/2021 |

OTHER PUBLICATIONS

Office Action issued for the corresponding Japanese Application No. 2023-155670, dated Apr. 17, 2024, with an English translation.
(Continued)

*Primary Examiner* — Robert K Arundale
(74) *Attorney, Agent, or Firm* — LUCAS & MERCANTI, LLP

(57) ABSTRACT

In an electrically operated valve including a valve main body having a valve chamber communicating with an inflow passage for refrigerant and an outflow passage for refrigerant, a valve body moving forward and backward for a valve seat formed within the valve chamber and changing a refrigerant flow rate, an electric motor driving the valve body, a board controlling the electric motor, and a board storage portion including a case storing the board, the board has a fixing hole fixing the board within the case, the case has a support projection fixed into the fixing hole and supporting the board within the case, and the support projection is integrally formed with the case portion. The support projection is preferably provided with a step portion and the board is preferably held by the step portion and a pressing projection disposed in a back surface of a lid occluding the case.

18 Claims, 23 Drawing Sheets

(58) Field of Classification Search
USPC .................................................. 251/129.15
See application file for complete search history.

(56) References Cited

U.S. PATENT DOCUMENTS

| 10,352,475 | B2* | 7/2019 | Uehara | ............... F16K 37/0041 |
|---|---|---|---|---|
| 2008/0142750 | A1* | 6/2008 | Tsuruta | ............... F15B 13/0853 |
| | | | | 251/129.15 |
| 2019/0232933 | A1* | 8/2019 | Kaneko | ................... B60T 8/344 |
| 2020/0163263 | A1* | 5/2020 | Zhang | ................... F16K 27/029 |
| 2020/0240539 | A1* | 7/2020 | Lan | ......................... F16K 31/02 |
| 2021/0254742 | A1* | 8/2021 | Zhang | ..................... F16K 31/04 |
| 2021/0270384 | A1 | 9/2021 | Huang et al. | |
| 2022/0196172 | A1* | 6/2022 | Yoshida | .............. B29C 66/8122 |
| 2024/0084914 | A1* | 3/2024 | Yoshida | ................. H02K 5/225 |

OTHER PUBLICATIONS

International Search Report issued for PCT Application No. PCT/JP2022/033522, dated Nov. 8, 2022.

\* cited by examiner

ELECTRICALLY OPERATED VALVE

CROSS REFERENCE TO RELATED APPLICATION

This Application is a 371 of PCT/JP2022/033522 filed on Sep. 7, 2022 which, in turn, claimed the priority of Japanese Patent Application No. 2021-183278 filed on Nov. 10, 2021, both applications are incorporated herein by reference.

TECHNICAL FIELD

The present invention relates to an electrically operated valve, and more particularly to an electrically operated valve including a board which controls an electric motor, and a resin case which stores the board.

BACKGROUND ART

An electrically operated valve controlling an opening degree of a valve with the use of an electric motor such as a stepping motor has been conventionally used for a refrigeration cycle apparatus which is provided with a refrigerant circuit such as an air conditioning machine and a refrigeration/freezing apparatus.

Further, as the electrically operated valve as described above, there is an electrically operated valve including a controller which controls an exciting current of a coil. The controller is mounted to a printed board, and the board (refer to "control board" or simply to "board" in the present application) is stored in a resin case which is disposed near a stator.

Further, the following patent literature 1 exists as a publication disclosing the electrically operated valve as described above.

CITATION LIST

Patent Literature

Patent Literature 1: Japanese Unexamined Patent Publication No. 2021-110409

SUMMARY OF INVENTION

In the meantime, in the electrically operated valve provided with the control board as mentioned above, the board has been attached by being screwed or caulked to a support portion which is disposed in the resin case, and there is left room for improvement about a structure for supporting the board. The attaching work by screwing or caulking can not be always said to have a good work efficiency. On the contrary, if the structure for supporting the board can be simplified, reduction of a parts number and an assembling step number can be caused. Therefore, it is possible to reduce a manufacturing cost of the electrically operated valve.

Further, in this kind of electrically operated valve, in order to prevent infiltration of moisture, the electric motor (a stator including a coil and a yoke) driving a valve body is covered with a resin cover (refer to "outer shell forming portion" or "outer shell cover" in the present invention). However, the resin case storing the board has been conventionally formed separately from the outer shell cover, and has been fixed to the outer shell cover (refer to the above-described patent literature 1). Therefore, with regard to these resin forming portion (outer shell cover and resin case), there is room for reduction in the manufacturing step number.

Accordingly, an object of the present invention is to allow a board to be attached to an electrically operated valve with good workability, and to reduce a parts number and a manufacturing step number of the electrically operated valve with board.

In order to solve the problem mentioned above and achieve the object, an electrically operated valve according to the present invention is an electrically operated valve including a valve main body having a valve chamber which is communicated with an inflow passage introducing a refrigerant and an outflow passage discharging the refrigerant, a valve body which changes a flow rate of the refrigerant by moving forward and backward with respect to a valve seat formed within the valve chamber between a valve close state seating on the valve seat and a valve open state separating from the valve seat, an electric motor which drives the valve body, a control board on which an electronic component controlling the electric motor is mounted, and a board storage portion which includes a case portion storing the control board, wherein the control board has a fixing hole which fixes the control board to an inner side of the case portion, the case portion has in an internal portion thereof a support projection which supports the control board within the case portion by being inserted into the fixing hole, and the support projection is integrally formed with the case portion.

The electrically operated valve according to the present invention is structured such that the control board is supported to the inner side of the case portion by inserting the support projection disposed within the case portion into the fixing hole of the control board without screwing or caulking. Therefore, according to the present invention, the board can be installed within the case only by slotting the support projection to the case portion while inserting the support projection into the fixing hole, the screw for supporting the board is not required, and the screwing work or the caulking work is not required. Thus, it is possible to reduce the parts number and the manufacturing step number. Further, a time for forming and attaching the support portion for supporting the board separately from the case portion is not required since the support portion is integrally formed with the case portion.

Further, the electrically operated valve according to the present invention may be provided with an outer shell forming portion which covers a stator of the electric motor, and the case portion may be integrally formed with the outer shell forming portion. According to the aspect mentioned above, it is possible to omit a work for manufacturing the case portion separately from the outer shell forming portion and fixing.

Further, in the electrically operated valve mentioned above, a coil coating forming portion covering a coil provided within the stator may be disposed in an inner side of the outer shell forming portion. According to the aspect as mentioned above, by performing two stages of forming steps (that is, constructing as a double coating structure), it is possible to prevent a winding wire of the coil from being damaged when forming, and it is possible to avoid void generation in the outer shell forming portion having a complex shape and reduction of strength. More specifically, it is possible to simultaneously achieve the winding wire breakage prevention when forming and the strength securement of the forming portion by forming at a low pressure the coil coating forming portion covering the coil which tends to be generated the breakage such as deformation, insulation failure and breaking of wire due to resin pressure application when forming, and thereafter forming at a high pressure the outer shell forming portion covering the coil coating forming portion.

In the meantime, the outer shell forming portion is preferably formed by introducing the resin from a gate (introducing port) at one position in such a manner as to prevent a weld line causing the reduction of strength from being generated. This is because of preventing a crack from being generated in the weld line due to the temperature change when aging use and preventing the moisture from infiltrating. On the contrary, when employing the double coating structure (structure provided with the coil coating forming portion in the inner side of the outer shell forming portion) as mentioned above, it is not particularly necessary to take into consideration the strength in the coil coating forming portion in which the strength can be secured by being covered by the outer shell forming portion. Therefore, it is possible to more securely cover the coil having the complex shape by introducing the resin from the gates at plural positions.

Further, as mentioned later, the double coating structure is also employed preferably in a case where the connector portion supporting the external portion connecting terminal to the internal portion is integrally formed with the outer shell forming portion and the case portion. A severe dimensional accuracy is required in the connector portion since the connector portion generally has a structure of fitting to the mating connection so as to form a sealed state. However, when employing the double coating structure as mentioned above, the connector portion can be formed at the high pressure together with the outer shell forming portion and the case portion, and the dimensional accuracy of the connector portion can be enhanced.

Further, in a case where the double coating structure as mentioned above is employed, the coil coating forming portion is preferably provided with a concavo-convex portion for positioning the coil coating forming portion within the outer shell forming portion. The coil covered with the coil coating forming portion can be precisely arranged within a metal mold forming the outer shell forming portion with the use of the concavo-convex portion when forming the outer shell forming portion. Thus, a relative positional precision between the outer shell forming portion and the coil (coil forming portion) to be formed can be enhanced.

The element "concavo-convex portion" mentioned above can be formed by a concave portion, for example, a hole (preferably a plurality of holes), however, may be formed by a convex portion such as a projection (preferably a plurality of projections).

Further, the present invention may be provided with a connector portion which enables an electrical connection with the external portion by supporting the external portion connecting terminal to an internal portion thereof, and the connector portion may be integrally formed with the outer shell forming portion and the case portion.

Further, according to an aspect of the present invention, the case portion has an opening which allows the control board to be installed in the internal portion, the electrically operated valve includes a lid body which occludes the opening, a connector portion including an external portion connecting terminal which enables the electrical connection to the external portion, and a terminal coating forming portion which covers an intermediate portion of the external portion connecting terminal and supports the external portion connecting terminal to the connector portion, and the connector portion and the lid body are integrally formed in such a manner as to cover and support the terminal coating forming portion.

Further, in the aspect mentioned above, the terminal coating forming portion is preferably provided with the concavo-convex portion for positioning the terminal coating forming portion within the connector portion. This is because the external portion connecting terminal covered with the terminal coating forming portion can be accurately arranged within the metal mold forming the connector portion with the use of the concavo-convex portion and the external portion connecting terminal can be installed with a good positional precision when forming the connector portion. The element "concavo-convex portion" can be formed by the concave portion (for example, hole) or the convex portion (for example, projection) in the same manner as mentioned above.

Further, in the present invention, one or more press-in type projection pressed in a fixing hole is preferably provided as the support projection. This is because the board can be more securely supported within the case portion.

For the same reason, in the present invention, the support projection may have a rod-shaped projection main body, and a protruding portion which extends in a length direction of the projection main body and protrudes outward from an outer peripheral surface of the projection main body to come into contact with an inner peripheral surface of the fixing hole when the support projection is inserted into the fixing hole. In this case, at least a part of the protruding portion may be adapted to be crushed within the fixing hole when the support projection is inserted into the fixing hole, so that the support projection is pressed in the fixing hole.

Further, the support projection is preferably provided with two or more protruding portions, and the two or more protruding portions are preferably arranged radially with respect to a central axis line of the projection main body. This is because the support projection can be easily inserted into the fixing hole when attaching the board and the board can be stably supported by the support projection.

Further, in the present invention, from the both point of view of workability when attaching the board, and certainty for support within the case portion (improvement of strength for supporting the board to the case portion), it is particularly preferably to employ the following aspect.

The case portion has an opening which allows the board to be installed in the internal portion, the electrically operated valve is provided with a lid body which occludes the opening, the support projection is provided with a step portion which comes into contact with a back surface of the board when slotting the board in the case portion while inserting the support projection into the fixing hole so as to stop the progress of the board toward a direction of a bottom surface of the case portion, the lid body is provided in an inner surface thereof with a pressing projection which comes into contact with a surface of the board when occluding the opening, and the board is held between the step portion and the pressing projection.

Further, in the aspect mentioned above, the pressing projection is preferably disposed so as to face to the support projection (in particular, the step portion), and the pressing projection is preferably adapted to have a tubular shape which can store a leading end portion of the support projection protruding out of the board. This is because the board can be firmly held. More specifically, on the assumption that a direction orthogonal to the board (length direction of the pressing projection and the support projection) is a "vertical direction", and a direction parallel to the board is a "horizontal direction", the pressing projection can be disposed at a position which does not face to the support projection and is deviated in the horizontal direction. In the structure as mentioned above, the board can be held. According to the aspect mentioned above, the pressing projection is adapted to come into contact with the surface of the board around the fixing hole (portion facing to the step portion and near the fixing hole), and the board can be more firmly held and supported by the pressing projection and the step portion which face to each other (overlap with each other looking from the vertical direction).

In the present invention, the board is supported within the case portion by the fixing hole which is provided in the board, and the support projection which is provided in the case portion. Plural sets of (for example, four sets of) the combination of the fixing hole and the support projection are preferably provided for securely supporting the board, that is, two or more fixing holes are preferably provided in the board, and two or more support projections are preferably provided in the case portion so as to correspond to the plurality of fixing holes. In this case, these two or more support projections are preferably adapted to include both the press-in type projection which is pressed in the fixing hole (that is, the support projection is inserted while being exposing to the pressure from the inner peripheral surface of the fixing hole when the support projection is put into from the support projection), and a loose-fit type projection which has a gap with respect to the inner peripheral surface of the fixing hole when being inserted into the fixing hole.

Because the support projection may be broken, for example, the support projection is snapped off due to a force applied when the board is attached or a vibration applied from a vehicle when the electrically operated valve is mounted to the vehicle and aging used, if all the support projections are formed by the press-in type projection. Further, if all the support projections are adapted to be pressed in the corresponding fixing holes, a high dimensional accuracy is demanded for a relative positional relationship between all the fixing holes and all the corresponding support projections, and a manufacturing cost is increased. Thus, the aspect as mentioned above is preferably employed.

Further, in the present invention, as a more specific structure of the case portion, the case portion may have an opening which allows the control board to be installed in the internal portion, the electrically operated valve may be provided with a lid body which occludes the opening, the lid body may be fixed to the case portion by melding both the case portion and the lid body (for example, by welding by an infrared light) in a contact portion between the case portion and the lid body, and the opening may be occluded by the lid body.

Further, the case portion may be provided in an internal portion thereof with a terminal which performs an electrical connection to the control board, and a height of the terminal may be higher than a height of the support projection. According to the aspect mentioned above, it is possible to achieve a relative positioning between the terminal and the board (for example, a through hole disposed in the board) by inserting the support projection into the fixing hole of the board, and the terminal can be fitted to and inserted into the board (through hole) only by fitting and inserting the support projection to the fixing hole formed in the board and thereafter progressing the board toward the bottom surface of the case portion when attaching the board.

The electrical connection between the board (through hole) and the terminal is preferably achieved by a press-fit connection (terminal is adapted to be pressed in the through hole of the board as a press-fit pin) from the point of view of reducing the manufacturing step number. However, it is possible to employ the other methods of installing the board within the case portion and thereafter soldering.

According to the present invention, it is possible to attach the board to the electrically operated valve with a good workability, it is possible to reduce the parts number and the manufacturing step number of the electrically operated valve with board, and it is possible to reduce the manufacturing cost of the electrically operated valve.

The other objects, features and advantages of the present invention are clarified by the following description of embodiments according to the present invention described on the basis of the accompanying drawings. It is apparent for a person skilled in the art that the present invention is not limited to the following embodiments, but can be variously modified within the scope of claims. Further, same reference numerals in the drawings denote the same or corresponding portions.

DESCRIPTION OF EMBODIMENTS

First Embodiment

Figure 1:
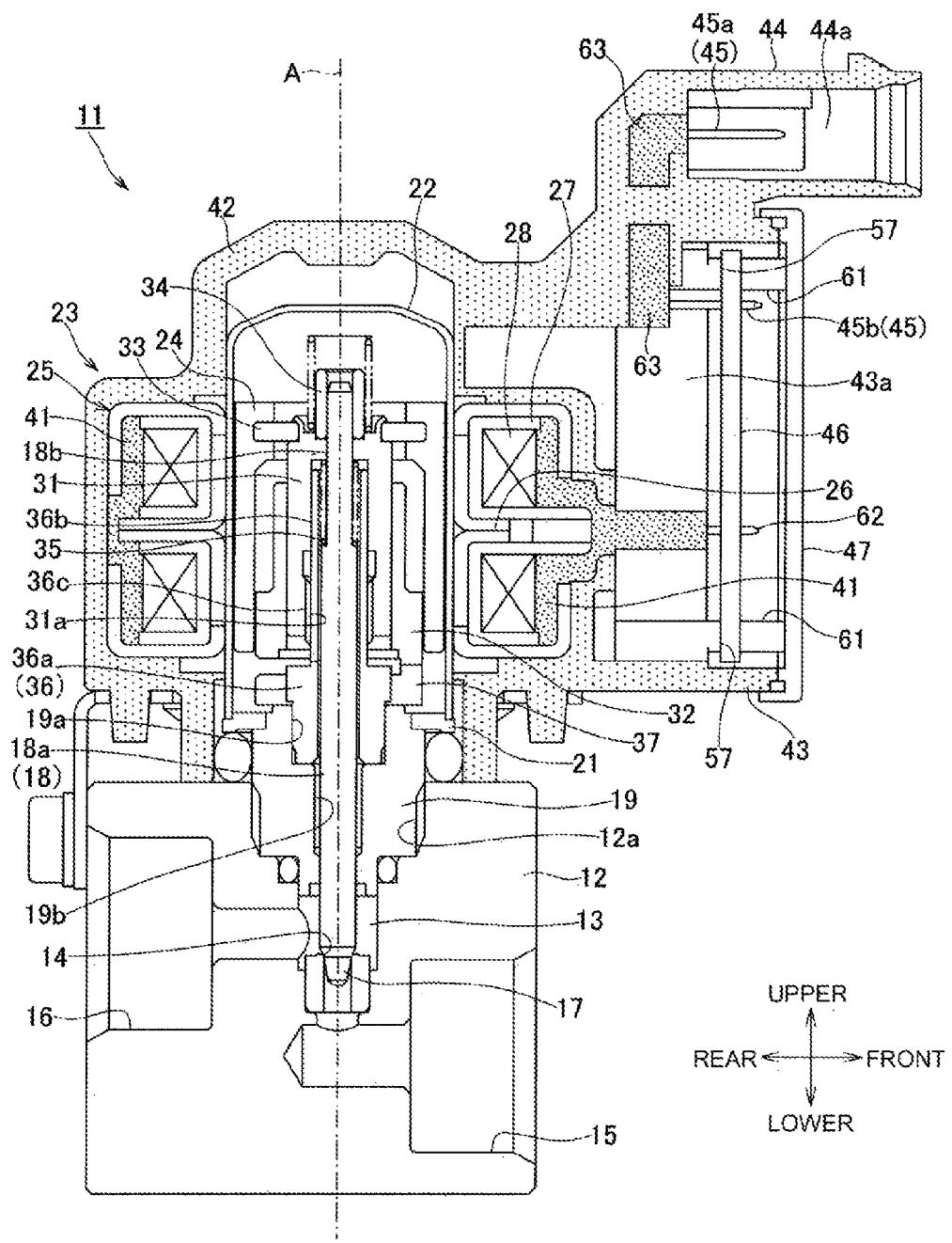
FIG. 1 is a vertical cross sectional view showing a valve close state of an electrically operated valve according to a first embodiment of the present invention.
Figure 2:
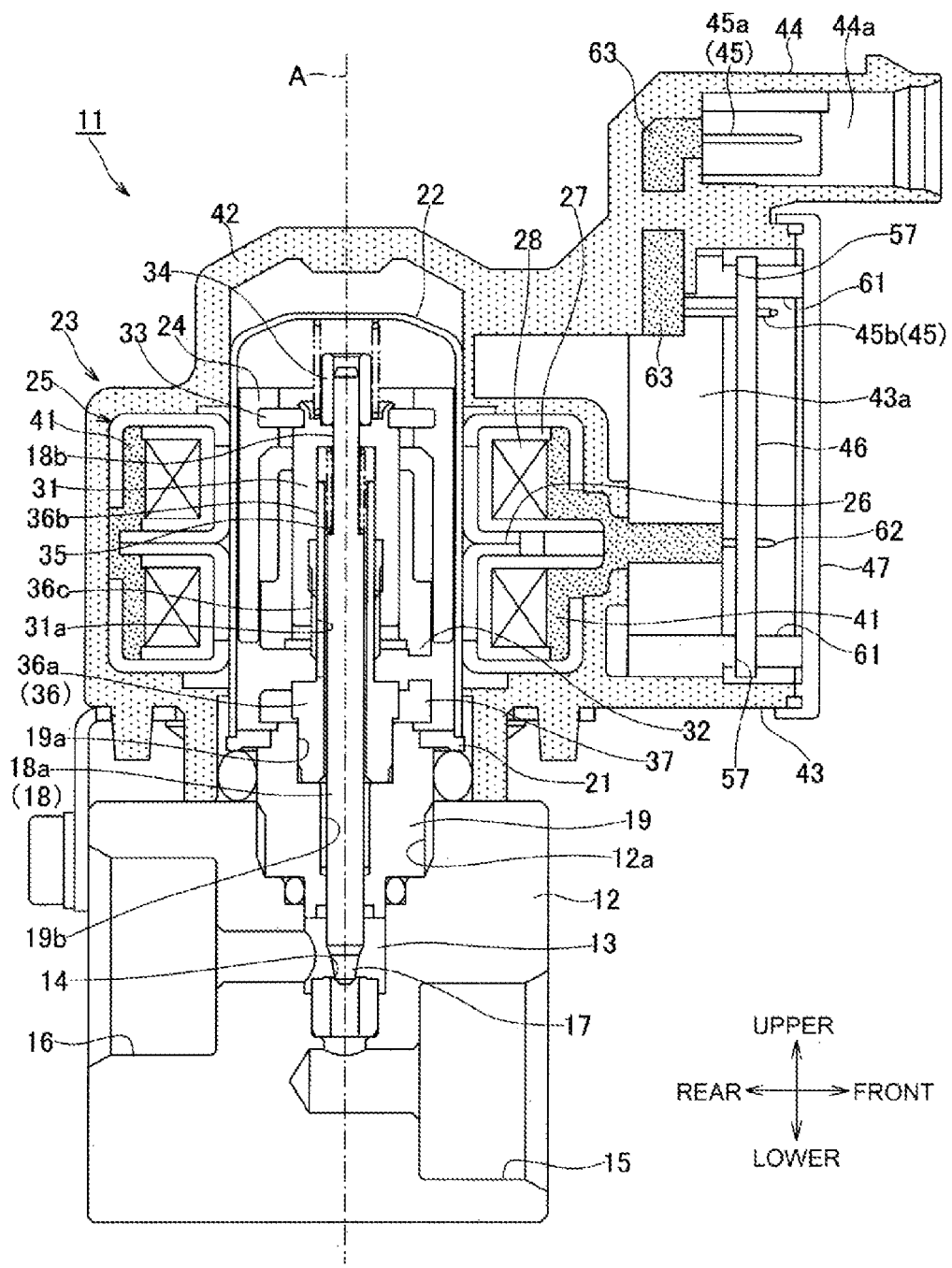
FIG. 2 is a vertical cross sectional view showing a valve open state of the electrically operated valve according to the first embodiment.

A description will be given of an electrically operated valve according to a first embodiment of the present invention with reference to FIGS. 1 to 21. Each of the drawings appropriately shows two-dimensional coordinates or three-dimensional coordinates which represent a longitudinal direction, a horizontal direction and a vertical direction and are orthogonal to each other, and the following description will be given on the basis of these directions (same applies to a second embodiment mentioned later).

An electrically operated valve 11 according to a first embodiment of the present invention is an electrically operated valve which is preferably used for regulating a flow rate of a refrigerant in a refrigeration cycle apparatus, for example, an air conditioning machine, and is provided with a valve main body 12 having a valve chamber 13 in an internal portion thereof and also having an inflow passage 16 which allows the refrigerant to flow into the valve chamber 13 and an outflow passage 15 which allows the refrigerant to flow out of the valve chamber 13, a valve seat 14 which is formed in an opening portion for the valve chamber 13 in the inflow passage 16, a valve body 17 which changes a passing quantity (flow rate) of the refrigerant by moving forward and backward (moving upward and downward) with respect to the valve seat 14 between a valve close state (refer to FIG. 1) coming into contact with the valve seat 14 and a valve open state (refer to FIG. 2) being away from the valve seat 14, an electric motor 23 which drives the valve body 17, a coupling member 19 which couples the electric motor 23 to the valve main body 12, a printed board (control board) 46 which mounts a controller (not shown) controlling the electric motor 23 thereon, a case (board storage portion/case portion) 43 which stores the board 46, a lid body 47 which occludes a front opening of the case 43, a connector 44 which has an external portion connecting terminal 45 electrically connecting to the external portion, and a can (sealed container) 22 which covers an upper opening 12a of the valve main body 12 communicating with the valve chamber 13 and forms a sealed space together with the coupling member 19. In the present embodiment, the refrigerant is flowed into from the inflow passage 16 and the refrigerant is flowed out of the outflow passage 15. However, it goes without saying that the electrically operated valve 11 can be used in a case where a flowing direction of the refrigerant is an inverse direction.

The electric motor 23 is constructed by a stepping motor including a stator 25 which is arranged in an outer side of the can 22, and a magnet rotor (hereinafter, refer simply to "rotor") 24 which is arranged in an inner side of the can so as to be rotatable and slidable in a vertical direction. Further, the stator 25 includes a yoke 26, a bobbin 27 and a coil 28.

The stator 25 and the can 22 are covered by an outer shell cover (outer shell forming portion) 42 made of a synthetic resin. Further, the outer shell cover 42 is provided in an inner side thereof with a coil cover (coil coating forming portion) 41 which covers the coil 28 and is made of a synthetic resin, and a terminal cover (terminal coating forming portion) 63 which covers and supports an intermediate portion of the external portion connecting terminal 45.

The external portion connecting terminal 45 has a leading end portion (end portion in the connector side) 45*a* which protrudes toward an internal space 44*a* of the connector 44 and allows an electrical connection to the external portion, and a base end portion (end portion in the board side) 45*b* which is electrically connected to the board 46. An intermediate portion corresponding to a portion between the leading end portion 45*a* and the base end portion 45*b* is covered by the terminal cover 63.

Further, each of the covers (coil cover 41, terminal cover 63 and outer shell cover 42) is formed according to an injection molding. In the order of formation, first of all, the coil cover 41 and the terminal cover 63 (fine dot pattern is applied to a cross section of each of the covers 41 and 63 in FIGS. 1 and 2) are independently formed (this step is called as "primary molding"), and the outer shell cover 42 (rough dot pattern is applied to a cross section in FIGS. 1 and 2) is formed in such a manner as to cover each of the covers (coil cover 41 and terminal cover 63) (this step is called as "secondary molding").

Here, in the primary molding, a positioning concave portion used when performing the secondary molding is formed in each of the coil cover and the terminal cover.

Figure 3:
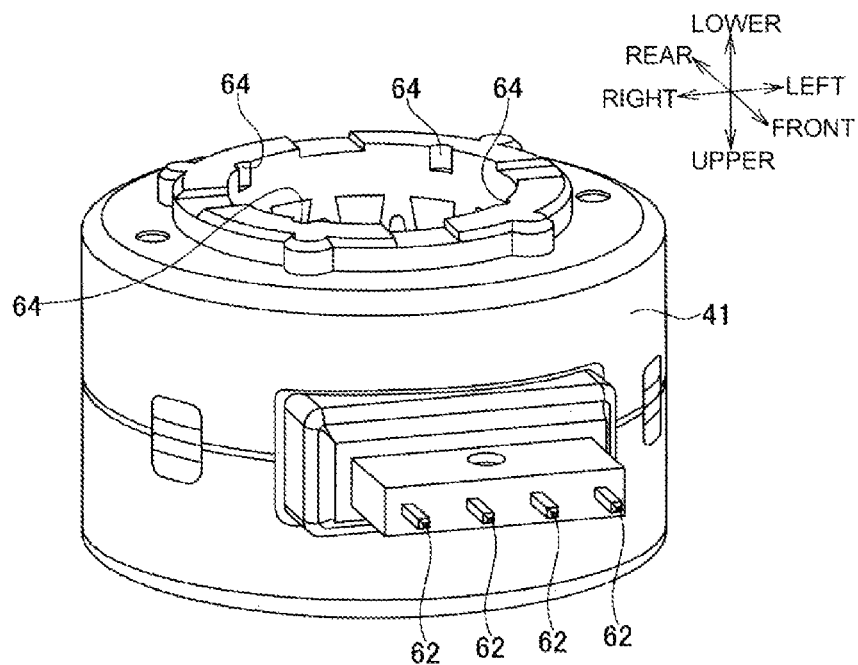
FIG. 3 is a perspective view showing a manufacturing step of the electrically operated valve according to the first embodiment, and shows a state in which a coil cover covering a coil is formed (state after finishing a primary molding).
Figure 4:
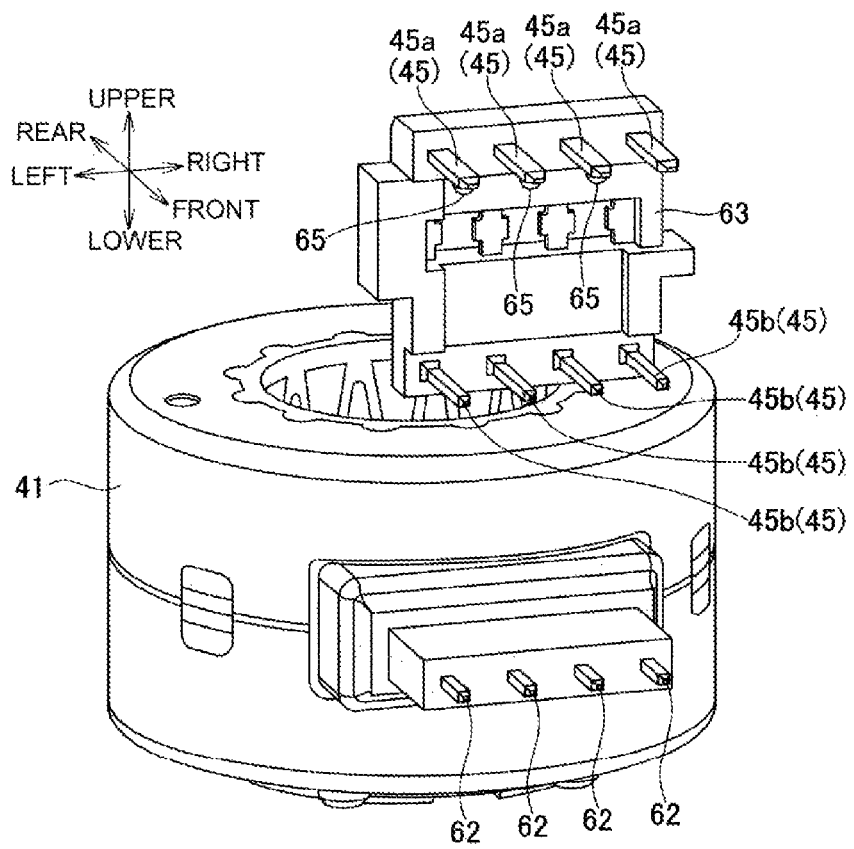
FIG. 4 is a perspective view showing the manufacturing step of the electrically operated valve according to the first embodiment, and shows a state in which the coil forming the coil cover and an external portion connecting terminal forming a terminal cover are arranged within a metal mold (not shown) forming an outer shell cover.
Figure 5:
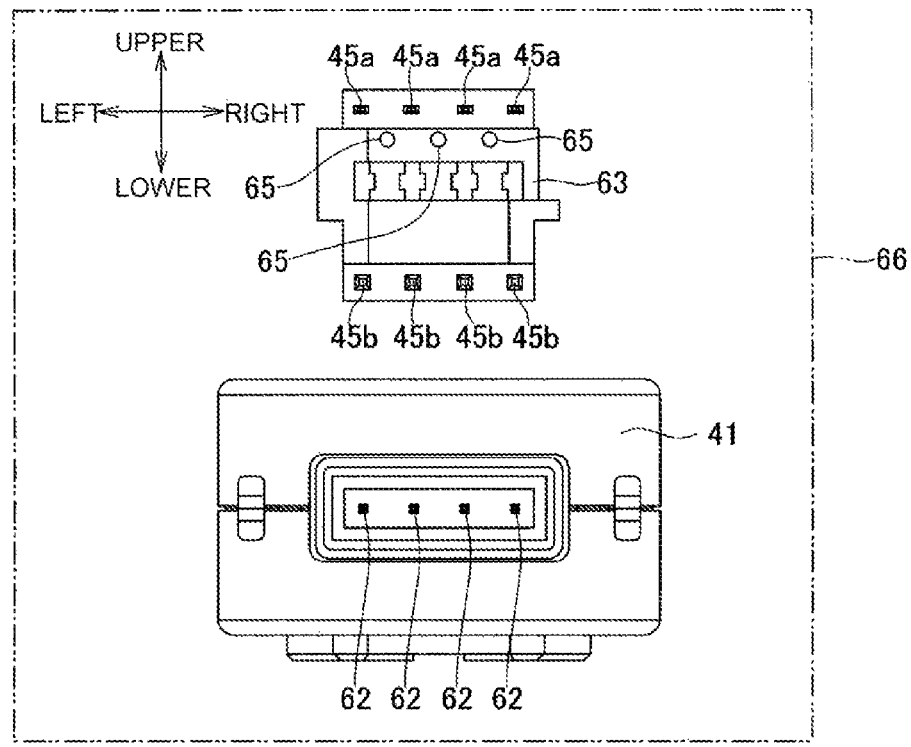
FIG. 5 is a front elevational view showing the manufacturing step of the electrically operated valve according to the first embodiment, and shows the state in which the coil forming the coil cover and the external portion connecting terminal forming the terminal cover are arranged within the metal mold (not shown) forming the outer shell cover.
Figure 6:
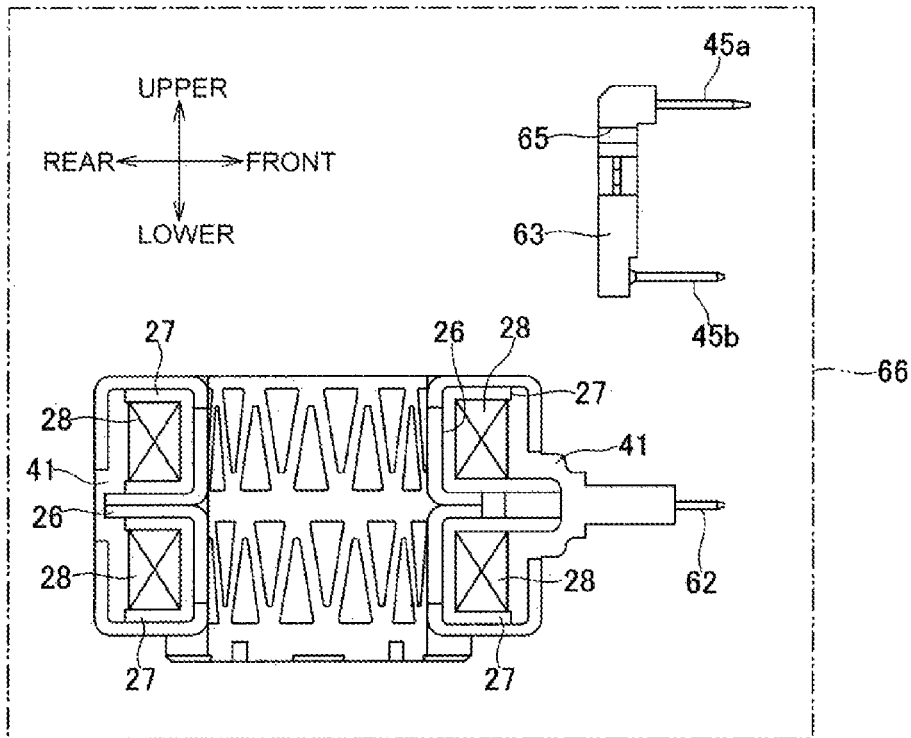
FIG. 6 is a vertical cross sectional view showing the manufacturing step of the electrically operated valve according to the first embodiment, and shows the state in which the coil forming the coil cover and the external portion connecting terminal forming the terminal cover are arranged within the metal mold (not shown) forming the outer shell cover, looking from a lateral surface side.

More specifically, FIG. 3 shows a state in which the coil after the primary molding is reversed upside down so that a lower surface side of the coil cover 41 is visible. However, as shown in FIG. 3, in the primary molding, a plurality of (four in the present embodiment) notched concave portions 64 are formed as concave portions for positioning in an inner peripheral edge portion of the bottom surface of the coil cover 41. Further, FIGS. 4 to 6 shows a state in which the coil (which is covered with the coil cover 41) after the primary molding and the external portion connecting terminal 45 (which is covered with the terminal cover 63 in an intermediate portion) are arranged within a metal mold 66 forming the outer shell cover 42. A plurality of (three in the present embodiment) holes 65 are formed as concave portions for positioning in the terminal cover 63. The metal mold 66 forming the outer shell cover 42 is provided in an internal portion thereof with engagement portions (for example, engagement projection (not shown)) which engage respectively with the notched concave portion and the hole.

Therefore, according to the present embodiment, it is possible to accurately arrange the coil 28 covered with the coil cover 41 and the external portion connecting terminal 45 provided with the terminal cover 63 within the metal mold 66 forming the outer shell cover 42 by the use of the concave portions 64 and 65 for positioning. Accordingly, it is possible to install the coil 28 and the external portion connecting terminal 45 within the outer shell cover 42 while accurately keeping a relative positional relationship between the coil 28 and the external portion connecting terminal 45. Further, in the present embodiment, the plurality of concave portions 64 and 65 for positioning are disposed respectively in the coil cover 41 and the terminal cover 63. Thus, it is possible to accurately position the coil 28 and the external portion connecting terminal 45 within the metal mold 66 performing the secondary molding, and it is possible to securely prevent a positional displacement from being generated in the coil 28 and the external portion connecting terminal 45 by the resin flowing into the metal mold 66 when performing the secondary molding.

When performing the secondary molding, the box-shaped case 43 storing the board 46 and the connector 44 are integrally formed with the outer shell cover 42. The resin materials constructing the coil cover 41, the terminal cover 63, the outer shell cover 42 (including the case 43 and the connector 44) and the lid body 47 mentioned later can be set to different kinds of materials, however, preferably employ the same material for enhancing a bondability between the resins.

In the present embodiment, the case 43 is disposed in a lateral side (front side) of the stator 25, and the connector 44 is disposed in an upper surface portion of the case 43. The board 46 is stored in the internal portion 43*a* of the case 43 through the front opening of the case 43, and the coil 28 is electrically connected to the external portion connecting terminal 45 via the board 46. This is because of enabling power feeding from an external power supply (not shown) to the coil 28. Further, a controller including a pulse generator and a motor driving circuit is mounted to the board 46. Further, in a case where a magnetic sensor detecting rotation of the rotor 24 is provided in the electrically operated valve 11, a computing apparatus computing an angle of rotation of the rotor 24 and an opening degree of the valve on the basis of an output signal from the magnetic sensor may be mounted to the board 46.

Each of the case 43 and the connector 44 is constructed as a sealable structure. More specifically, in the connector 44, the internal portion 44*a* of the connector 44 comes to a sealed state by fitting a mating connector to a front end portion thereof. The mating connector means a connector having a specific shape which can be fitted and connected to a connector of the electrically operated valve. More specifically, the connector is generally manufactured in such a manner as to have a specific shape (fixed shape which is different for every user and is previously determined) adapted to (conform to) the user side of the electrically operated valve, and the connector comes to the sealed state by fitting the mating connector having the specific shape as mentioned above thereto. The sealed state means a state in which any moisture does not infiltrate into the internal portion 44*a* of the connector 44 in a normal use state of the electrically operated valve 11. In the present embodiment, the internal portion 44*a* of the connector 44 is cut off from the external space (atmosphere side).

In the meantime, the case 43 comes to a sealed state by welding the resin lid body 47 to the front opening and closing the front opening. The attachment of the lid body to the case will be later described in detail together with a structure for supporting the board.

Further, the electrically operated valve 11 according to the present embodiment is provided with a rod-shaped valve stem 18 which extends in a vertical direction from an internal portion of the rotor 24 toward the valve chamber 13 along a central axis line A. The valve stem 18 has a columnar barrel portion 18*a*, and an upper small-diameter portion 18*b* which is coaxially formed in an upper end portion of the barrel portion 18*a* in succession to the barrel portion 18*a* and has a small outer diameter. Further, the valve body 17 is integrally provided in a lower end of the valve stem 18 (barrel portion 18*a*). The rotor 24 is arranged in an inner side of the can 22 so as to be rotatable and slidable in the vertical direction, and the valve is opened and closed by the integral movement in the vertical direction of the valve step 18 provided with the valve body 17 in the lower end and the rotor 24.

A valve stem holder 31 is disposed in an inner side of the rotor 24. The valve stem holder 31 has a cylindrical shape which is closed in an upper end, and a support ring 33 is fixed to an upper end portion of the valve stem holder 31 according to a caulking. Further, the rotor 24 and the valve stem holder 31 are integrally connected via the support ring 33. A female screw portion 31*a* is formed on an inner peripheral surface of the valve stem holder 31. The female screw portion 31*a* constructs a transfer mechanism (screw feeding mechanism) which is threadably mounted on a male screw portion 36*a* of a guide bush 36 mentioned later and converts the rotation of the electric motor 23 into a linear motion to transfer to the valve stem 18.

The upper small-diameter portion 18*b* of the valve stem 18 passes through the valve stem holder 31, and a push nut 34 for retaining is attached to an upper end portion of the upper small-diameter portion 18*b*. The valve stem 18 is biased downward by a compression coil spring 35 which is disposed between the valve stem holder 31, and a step portion between the barrel portion 18*a* and the upper small-diameter portion 18*b* in the valve stem 18. Therefore, the valve stem 18 is regulated its relative movement in the vertical direction to the valve stem holder 31 by the push nut 34 and the compression coil spring 35, and moves upward and downward together with the valve stem holder 18.

The coupling member 19 is a tubular member having a large-diameter hole 19*a* and a small-diameter hole 19*b* which are through holes communicating with each other. The large-diameter hole 19*a* passes through an upper center portion of the coupling member 19, and has a large diameter so that the guide bush 36 mentioned later can be fitted and inserted from the above. The small-diameter hole 19*b* passes through a lower center portion of the coupling member 19 and has a small diameter. Further, the cylindrical can 22 which is covered and not bottomed (in which a bottom surface is opened and a top surface is occluded) is joined to an outer peripheral surface of the upper end portion of the coupling member 19 via a ring-shaped base plate 21.

The guide bush 36 is fixed to the large-diameter hole 19*a* in the upper portion of the coupling member 19. The guide bush 36 has a large-diameter cylindrical portion 36*a* which has a large outer diameter, and a small-diameter cylindrical portion 36*b* which is coaxially formed in an upper end portion of the large-diameter cylindrical portion 36*a* in succession to the large-diameter cylindrical portion 36*a* and has a small outer diameter. A male screw portion 36*c* threadably mounted on the female screw portion 31*a* of the valve stem holder 31 is formed on an outer peripheral surface of the small-diameter cylindrical portion 36*b*. The guide bush 36 is connected to the coupling member 19 by pressing the large-diameter cylindrical portion 36*a* in an inner side of the coupling member 19. Further, the barrel portion 18*a* of the valve stem 18 passes through the small-diameter hole 19*b* of the coupling member 19.

Further, an upper stopper body 32 is disposed in the valve stem holder 31, and a lower stopper body 37 is disposed in the large-diameter cylindrical portion 36*a* of the guide bush 36. The stopper bodies 32 and 37 are provided for determining a lower limit position of the valve stem holder 31, and when the valve stem holder 31 moves down by rotating to reach the lower limit position, the upper stopper body 32 comes into contact with the lower stopper body 37 and further rotation of the valve stem holder 31 is regulated.

The mechanism for transferring the drive force of the electric motor 23 to the valve body 17 can employ various mechanisms in addition to the above mechanism, and is not limited to the above structure.

A description will be given below of a motion of the electrically operated valve 11 according to the present embodiment.

When an electric current is supplied to the stator 25 (coil 28) in such a manner that the rotor 24 turns in one direction from the valve close state shown in FIG. 1, the valve stem holder 31 connected to the rotor 24 turns together with the rotor 24. Since the female screw portion 31*a* threadably mounted on the male screw portion 36*c* formed on the outer peripheral surface of the small-diameter cylindrical portion 36*b* of the guide bush 36 is formed on the inner peripheral surface of the valve stem holder 31, the rotation of the rotor 24 (valve stem holder 31) is converted into the liner motion in the vertical direction on the basis of an interaction of the male screw portion 36*c* and the female screw portion 31*a*, and the valve stem holder 31 moves upward. As a result, the rotor 24 connected to the valve stem holder 31, and the valve stem 18 regulating its relative movement to the valve stem holder 31 also move upward together with the valve stem holder 31. The valve body 17 disposed in the lower end of the valve stem 18 is away from the valve seat 14 accompanied with the upward movement of the valve stem 18, so that the refrigerant flowing into from the inflow passage 16 is going to flow out of the outflow passage 15 through the valve chamber 13 (refer to FIG. 2). A passing quantity (refrigerant flow rate) of the refrigerant can be adjusted on the basis of an amount of rotation of the rotor 24.

On the contrary, when the electric current is supplied to the stator 25 (coil 28) in such a manner that the rotor 24 turns in a direction opposite to the one direction from the valve open state, the rotation of the rotor 24 (valve stem holder 31) is converted into the linear motion in the vertical direction on the basis of the interaction of the female screw portion 31*a* and the male screw portion 36*c*. As a result, the valve stem holder 31 moves downward together with the rotor 24 and the valve stem 18. Thus, the valve body 17 moves downward toward the valve seat 14, and a flow passage between the inflow passage 16 and the outflow passage 15 is cut off when the valve body 17 comes into contact with the valve seat 14, thereby coming to the valve close state (refer to FIG. 1).

A description will be given of the structure for supporting the board 46 to the case 43, and the attachment of the lid 47 to the case 43 with reference to FIGS. 7 to 21.

The present embodiment is provided with support projections 51 and 58 which are integrally formed with the case 43, a fixing hole 67 which is pierced in the board 46, and a pressing projection 61 which is formed in a back surface (inner surface) of the lid body 47 occluding the front opening of the case 43, as means for supporting the board 46 in the internal portion of the case 43, and controls the movement of the board 46 in a vertical direction by holding the board 46 by means of a step portion 57 and a pressing projection 61 disposed in the support projections 51 and 58 as well as controlling the movement of the board 46 in a horizontal direction by the support projections 51 and 58 fitted and inserted to the fixing hole 67, thereby supporting the board 46 to the internal portion of the case 43.

Describing each of the means in particular, the internal portion of the case 43 is provided with a plurality of (four in the present embodiment) support projections 51 and 58 which rise vertically (forward) from the bottom surface portion of the case 43. Further, the board 46 is provided with a plurality of (four in the present embodiment so as to correspond to the support projections) fixing holes 67 to which the support projections 51 and 58 are fitted and inserted. Further, a back surface (inner surface) of the lid body 47 occluding the front opening of the case 43 is provided with the pressing projection 61 which comes into contact with the surface of the board 46 when the board 46 is installed within the case 43 and the lid body 47 is joined to the case 43.

The support projections 51 and 58 are constructed by two press-in projections (press-in type projections) 51 and two loose-fit projections (loose-fit type projections) 58. These support projections 51 and 58 are integrally formed with the case 43 according to the secondary molding which forms the outer shell cover 42. Further, the step portions 57 expanding horizontally toward an outer side from a peripheral edge of the fixing hole 67 are formed in the bottom surface portions of the support projections 51 and 58. These step portions 57 is adapted to perform a function for stopping the progress of the board 46 (receiving the back surface of the board 46) by the contact of the back surface of the board 46 when inserting the support projections 51 and 58 into the fixing holes 67 and progressing the board 46 to the direction of the bottom surface of the case 43 and holding the board 46 in cooperation with the pressing projections 61 formed in the back surface of the lid body 47.

Figure 10:
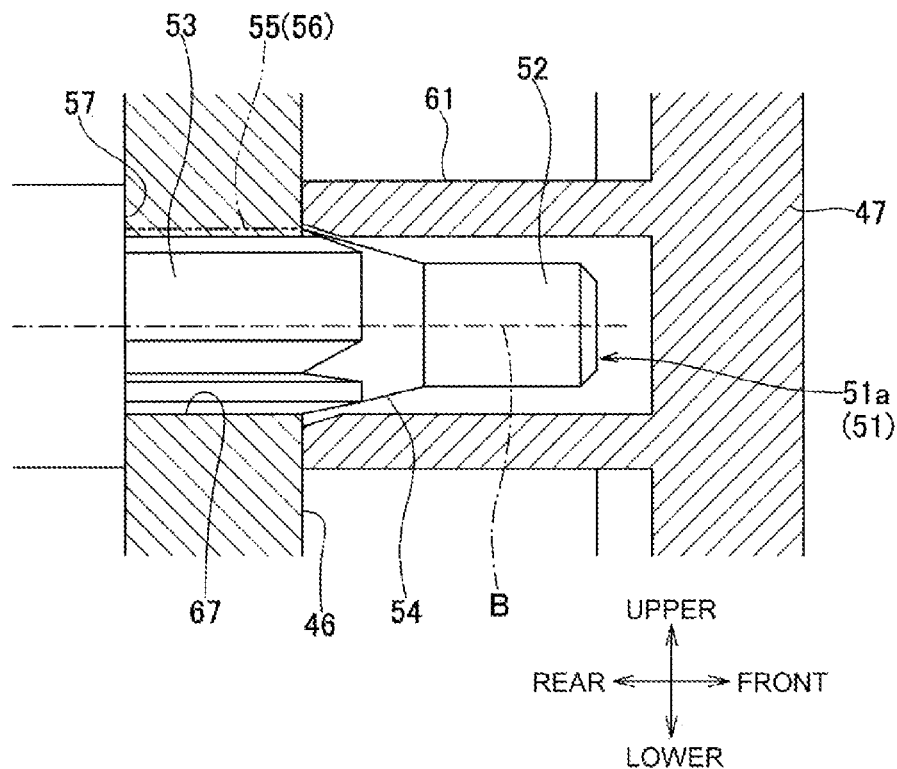
FIG. 10 is a vertical cross sectional view showing a relationship among a fixing hole of the board, a press-in projection of the case, and a pressing projection of the lid body in an enlarged manner, for the electrically operated valve according to the first embodiment.
Figure 11:
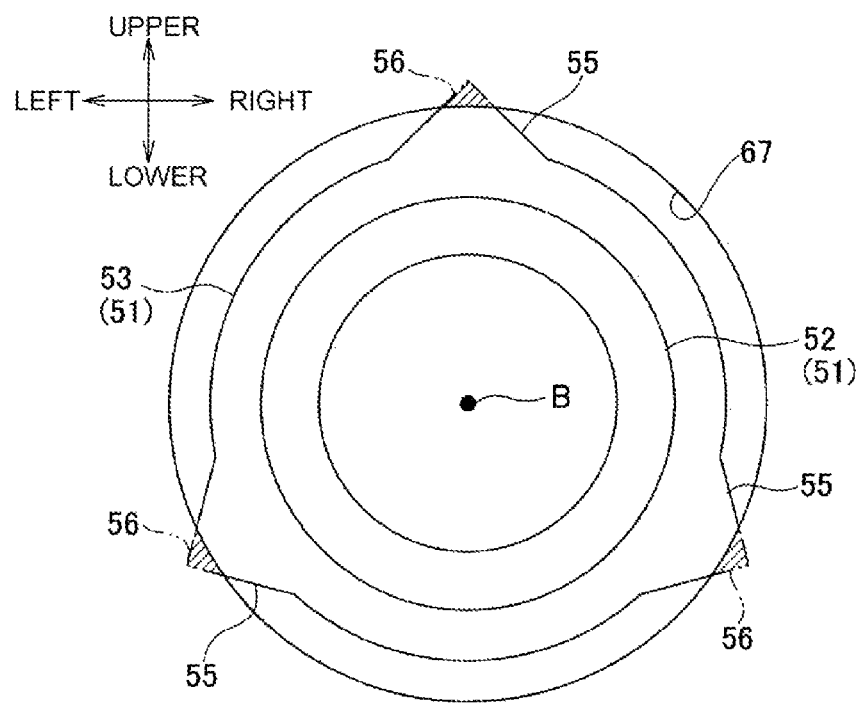
FIG. 11 is a front elevational view showing the relationship between the fixing hole of the board and the press-in projection of the case, for the electrically operated valve according to the first embodiment.

As shown in FIGS. 10 and 11 in an enlarged manner, the press-in projection 51 has a projection main body 51a which has an approximately columnar shape, and a protruding portion 55 which protrudes outward from an outer peripheral surface of the projection main body 51a. The protruding portion 55 extends in a vertical direction (longitudinal direction) which corresponds to a length direction of the press-in projection 51, and has a triangular transverse cross sectional shape (refer to FIG. 11) which is sharpened toward an outer direction from an outer peripheral surface of the projection main body 51a.

A ridge line portion (apex portion of the triangle when viewed from the transverse cross section) of the protruding portion 55 protrudes outward from an inner peripheral surface of the fixing hole 67 in the board 46. When putting a portion where the protruding portion 55 is formed (this portion is called as "press-in portion") into the fixing hole 67 in the longitudinal direction of the press-in projection 51, the ridge line portion (hatched portion in FIG. 11) 53 of the protruding portion 55 is crushed within the fixing hole 67. As a result, the press-in projection 51 is fixed within the fixing hole 67.

Further, a plurality of (three in the present embodiment) protruding portions 55 are formed in each of the press-in projections 51, and these three protruding portions 55 are arranged in such a manner that the protruding portions 55 are radially arranged with respect to a central axis line B of the press-in projection 51 (angles formed by the adjacent protruding portions 55 are equal, that is, 120 degrees in the present embodiment). This is because of preventing the board 46 from being exposed to the force in the horizontal direction from the protruding portion 55 when pressing the press-in projection 51 in the fixing hole 67 of the board 46 to cause a lateral displacement and stably supporting the board 46 within the case 43. The number of the protruding portions 55 can be set to be, for example, four, or two or less or five or more.

Further, a leading end (front end) portion of the projection main body 51a is formed as a small-diameter portion 52 in which an outer diameter is made small in such a manner as to be easily inserted into the fixing hole 67 of the board 46, and a taper surface 54 is formed from the small-diameter portion 52 to the press-in portion 53, the taper surface having an outer diameter which is increased little by little. This is because the board 46 (fixing hole 67) is smoothly guided to the press-in portion 53. Further, with regard to the protruding portion 55, a front end portion (leading end portion in the length direction) thereof is formed into a taper shape in such a manner that a height of the ridge line portion 56 is increased little by little toward a rear side in correspondence to the taper surface 54.

Figure 12:
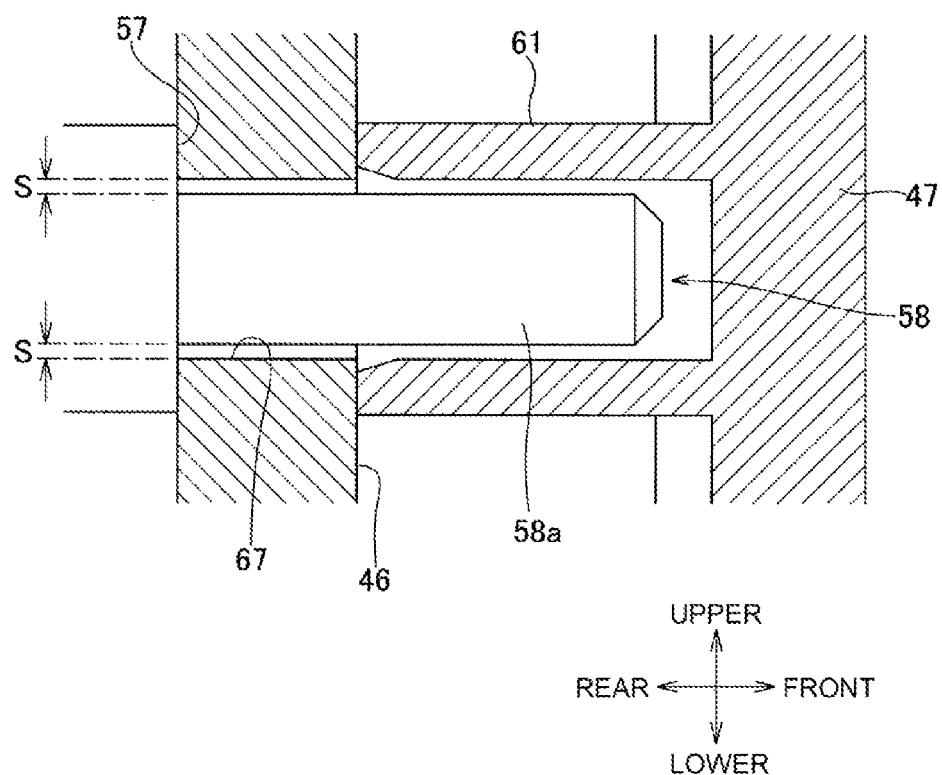
FIG. 12 is a vertical cross sectional view showing a relationship among the fixing hole of the board, a loose-fit projection of the case, and the pressing projection of the lid body in an enlarged manner, for the electrically operated valve according to the first embodiment.

In the meantime, the loose-fit projection 58 is provided in a bottom surface portion with a step portion 57 which performs the same function as the step portion 57 of the press-in projection 51 as shown in FIG. 12, and has a columnar projection main body 58a which rises vertically (forward) from the step portion 57. The projection main body 58a has such an outer diameter that a fixed gap S is formed with respect to an inner peripheral surface of the fixing hole 67 in the board 46.

The support projections 51 and 58 are arranged in four corners of the case 43 having a rectangular front shape. In more detail, the press-in projections 51 are arranged in both end portions of one diagonal line of the case 43, and the loose-fit projections 58 are arranged I both end portions of the other diagonal line of the case 43, respectively. All the support projections 51 and 58 can be constructed by the press-in projection 51. However, if all the support projections are constructed by the press-in projection 51, a high dimensional accuracy is demanded for the relative positional relationship between the support projection 51 and the fixing hole 67 as mentioned above, and the manufacturing cost is increased. Further, due to the force application when attaching to the board or the vibration applied when being mounted to the vehicle and aging used, there is a risk that the support portion of the board 46 is damaged, for example, snapping off of the support projection 51. Therefore, the loose-fit projection 58 is included in the present embodiment.

The pressing projection 61 in the back surface of the lid body 47 has a cylindrical shape which can store the leading end portions of the support projections 51 and 58. A height (dimension in a length direction) of the pressing projection 61 is set to a height that a fixed gap is formed from the surface of the board 46 (refer to FIG. 19 mentioned later) when the lid body 47 is put on the front opening of the case 43 and the peripheral edge portion of the lid body 47 is brought into contact with the peripheral edge portion of the front opening, and the pressing projection 61 comes into contact with the surface of the board 46 (refer to FIG. 20 mentioned later) when the lid body 47 is welded (melt joined) to the case 43. The reason why the pressing projection 61 is constructed as the above height structure will be later mentioned in detail.

A description will be given of the installation of the board 46 to the case 43 and the attachment of the lid body 47 step by step according to a manufacturing step with reference to FIGS. 13 to 20.

Figure 13:
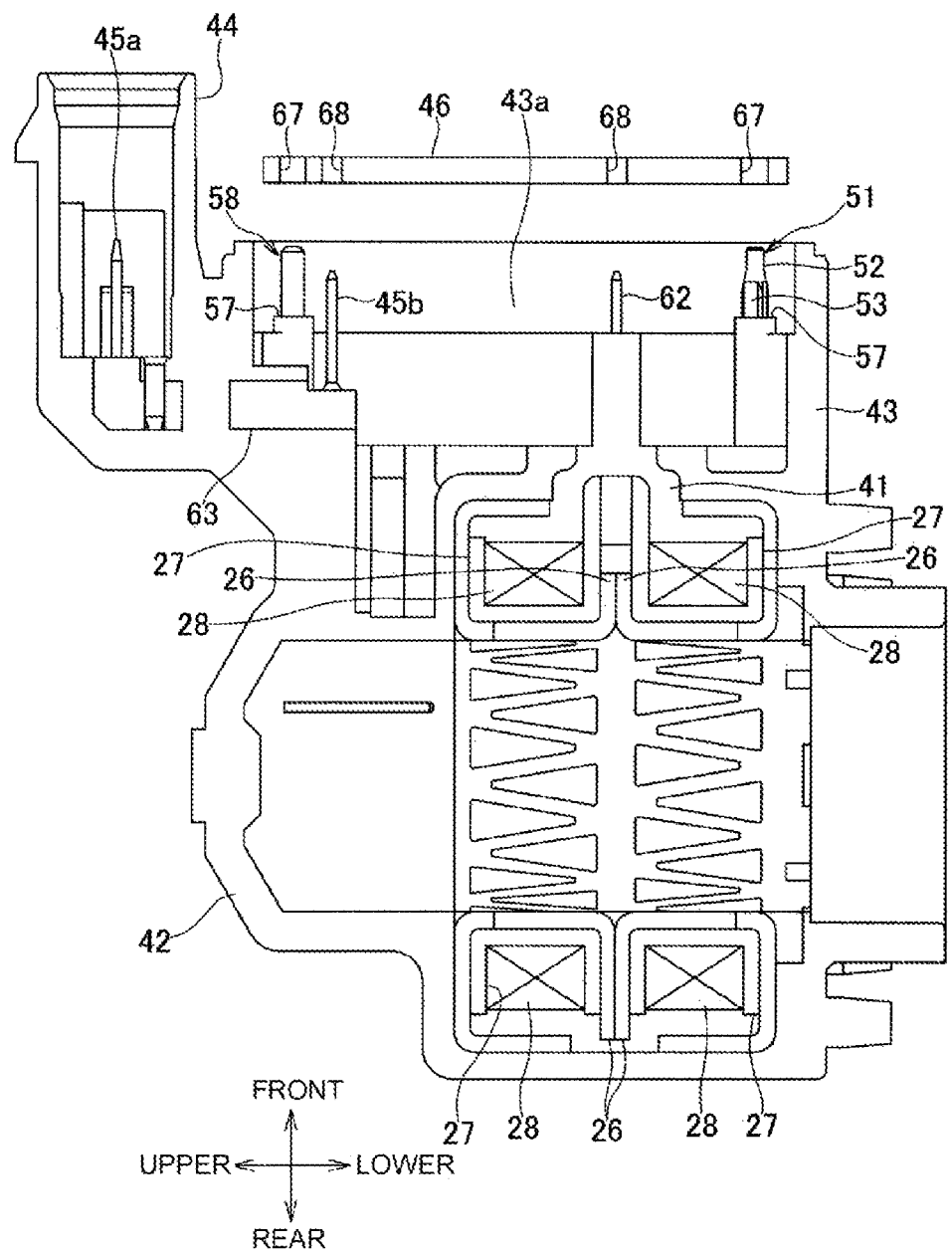
FIG. 13 is a cross sectional view showing the manufacturing step of the electrically operated valve according to the first embodiment, and shows a state before the board is attached within the case.
Figure 14:
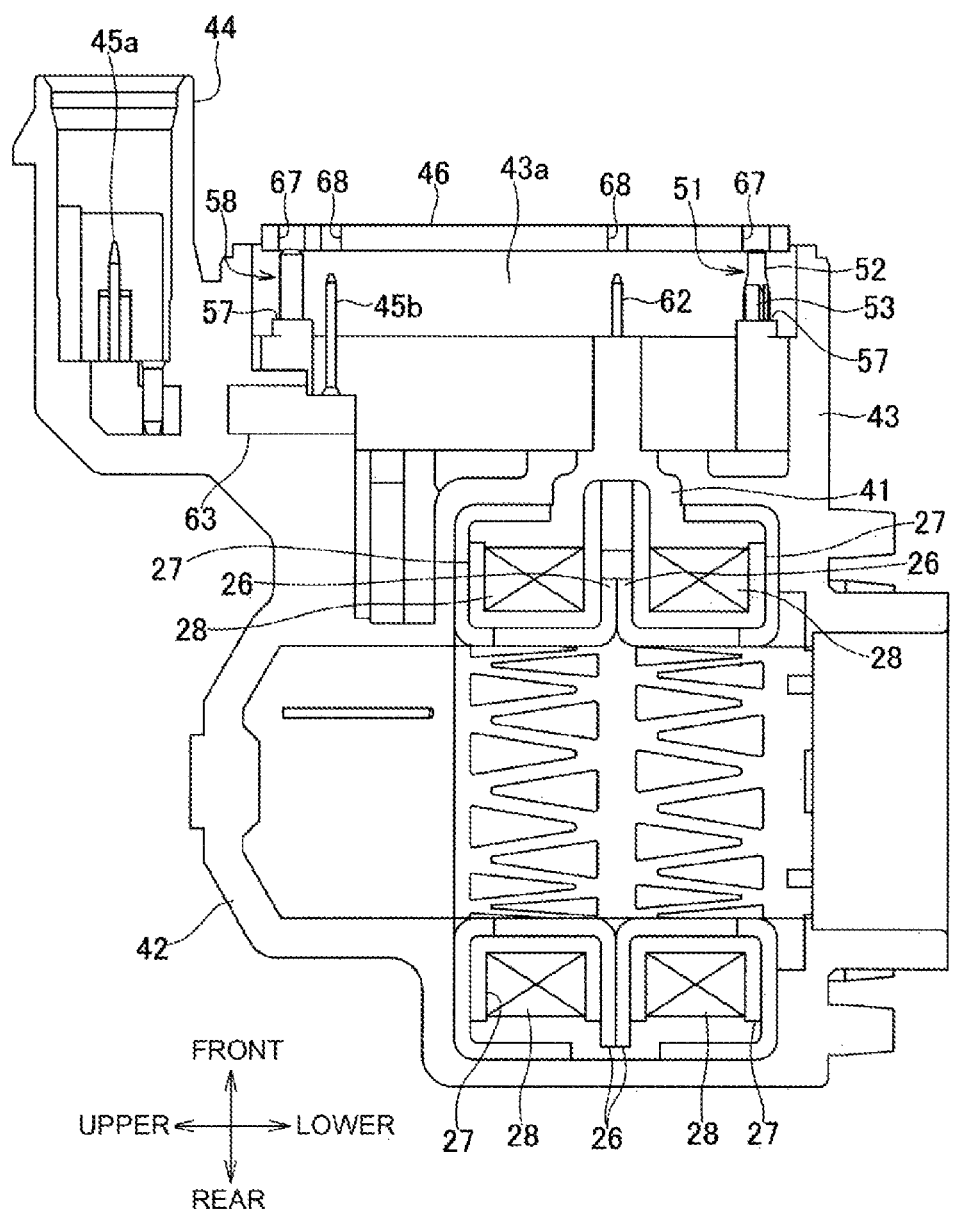
FIG. 14 is a cross sectional view showing the manufacturing step of the electrically operated valve according to the first embodiment, and shows a state in which a support projection of the case begins to be inserted into the fixing hole of the board.
Figure 15:
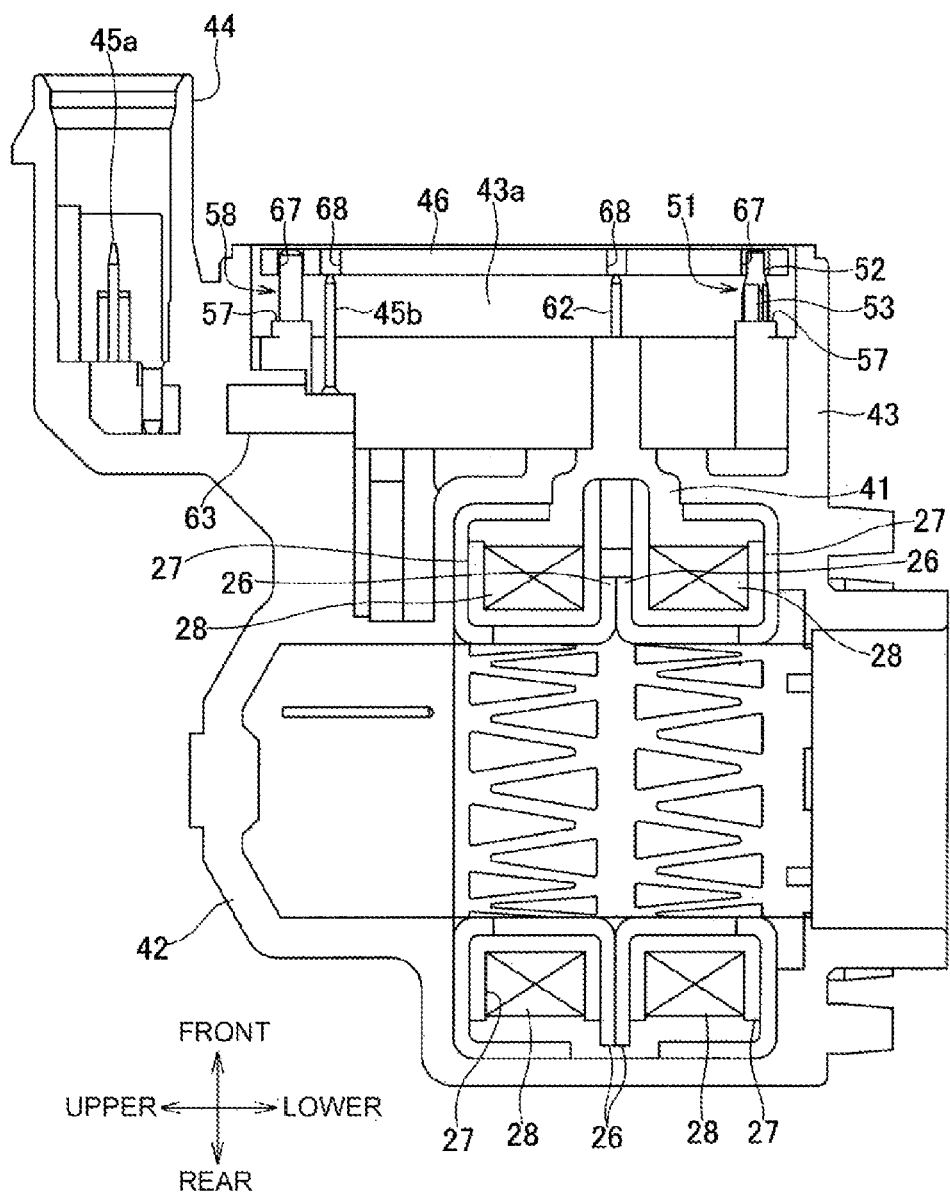
FIG. 15 is a cross sectional view showing the manufacturing step of the electrically operated valve according to the first embodiment, and shows a state in which the support projection is inserted into the fixing hole of the board, and a terminal begins to be inserted into a through hole.
Figure 16:
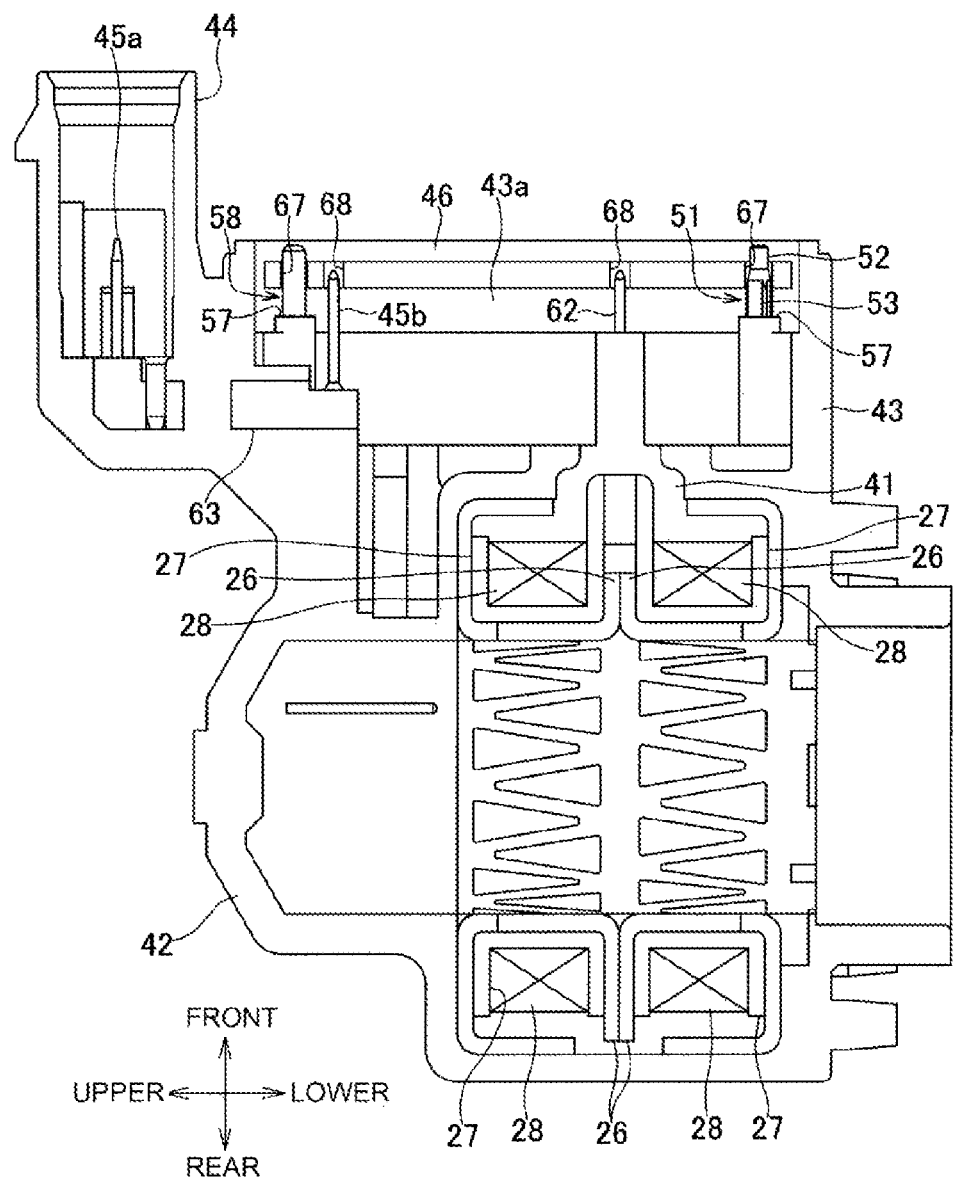
FIG. 16 is a cross sectional view showing the manufacturing step of the electrically operated valve according to the first embodiment, and shows a state in which the terminal is inserted into the through hole, and the support projection begins to be pressed in the fixing hole.

As shown in FIGS. 13 to 14, when the board 46 is set horizontally (in parallel to the bottom surface of the case 43) and is slotted in the case 43 from the front opening, the leading end portions of the support projections (press-in projection 51 and the loose-fit projection 58) in the case 43 are first put into the fixing hole 67 of the board 46 (refer to FIG. 15).

Next, when the board 46 is going to be progressed toward the bottom surface of the case 43 from this state, the terminals 45b and 62 disposed within the case 43 are going to be put into a through hole 68 disposed in the board 46. Since the leading end portions of the support projections 51 and 58 are put into the fixing holes 67 in the step shown in FIG. 15 at this time, the relative positioning between the board 46 and the case 43 in the horizontal direction is approximately finished (the board 46 is not positionally displaced in the horizontal direction beyond a smaller gap in the gap between the small-diameter portion 52 in the leading end of the press-in projection and the inner peripheral surface of the fixing hole 67, and the gap S between the loose-fit projection 58 and the fixing hole 67), and it is possible to smoothly insert the terminals 45b and 62 into the through hole 68 (refer to FIG. 16). Further, the pressing-in operation of the press-in projection 51 (insertion of the press-in portion 53 into the fixing hole 67) is simultaneously started.

Figure 17:
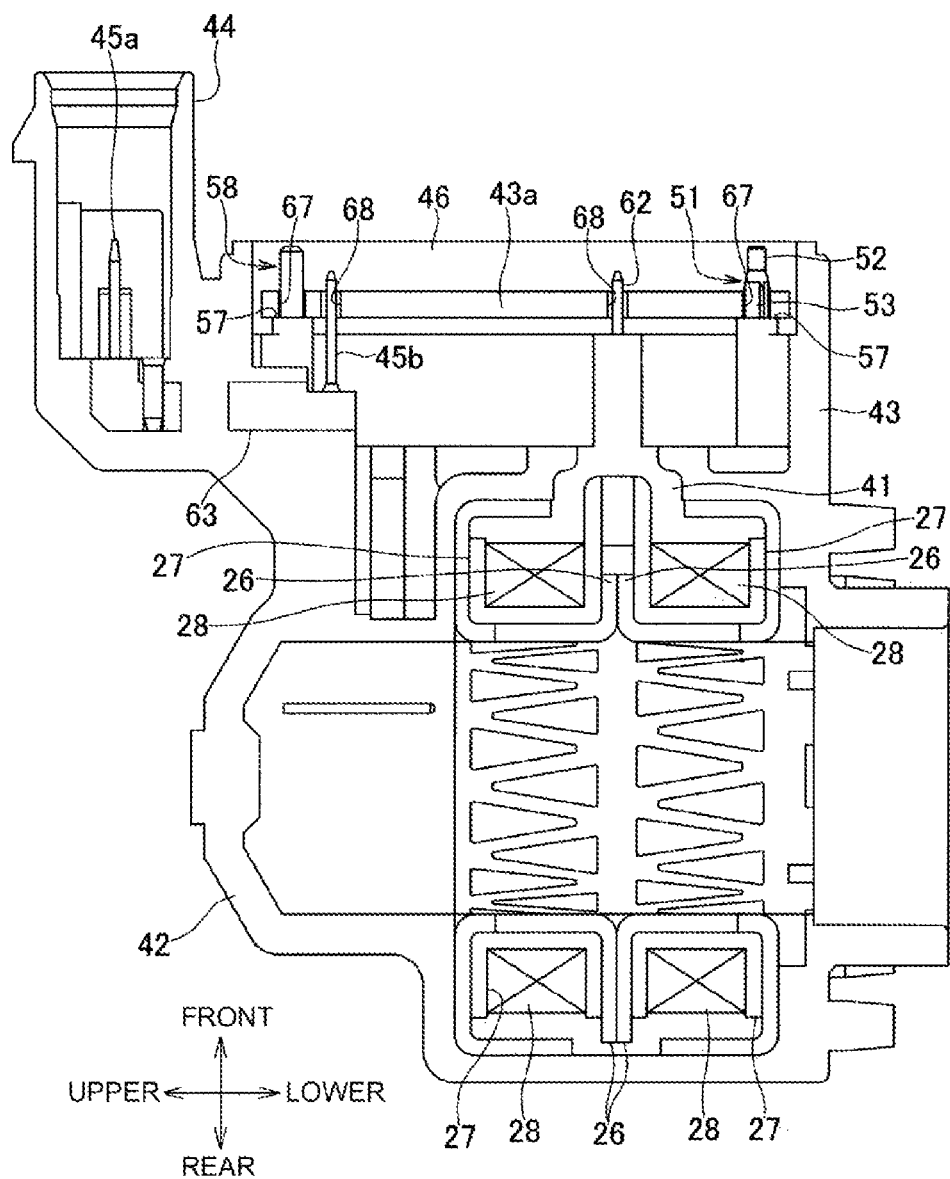
FIG. 17 is a cross sectional view showing the manufacturing step of the electrically operated valve according to the first embodiment, and shows a state in which the pressing operation of the support projection in the fixing hole is finished.

Further, when the board 46 is advanced rearward (toward the bottom surface in the case) until the back surface of the board 46 runs into the step portion 57 as shown in FIG. 17, the arrangement of the board 46 is finished.

The electrical connection between the terminals 45b and 62 and the board 46 (through hole 68) may be achieved by a press-fit connection in which the terminals 45b and 62 are formed as the press-fit pin (electrical connection is achieved by pressing in the through hole 68), or may be achieved by soldering after arranging the board 46.

Figure 18:
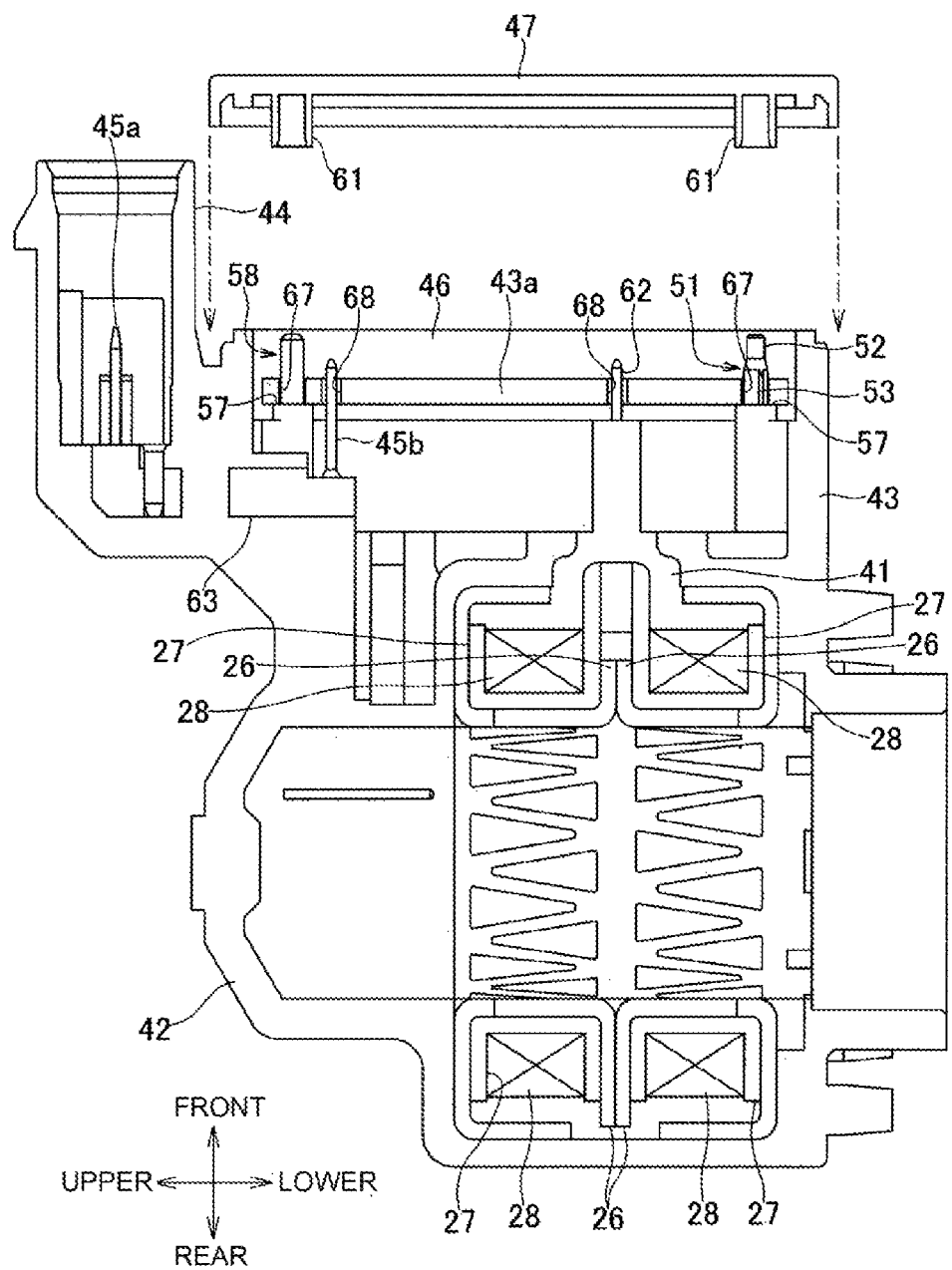
FIG. 18 is a cross sectional view showing the manufacturing step of the electrically operated valve according to the first embodiment, and shows a state before attaching a lid body.
Figure 19:
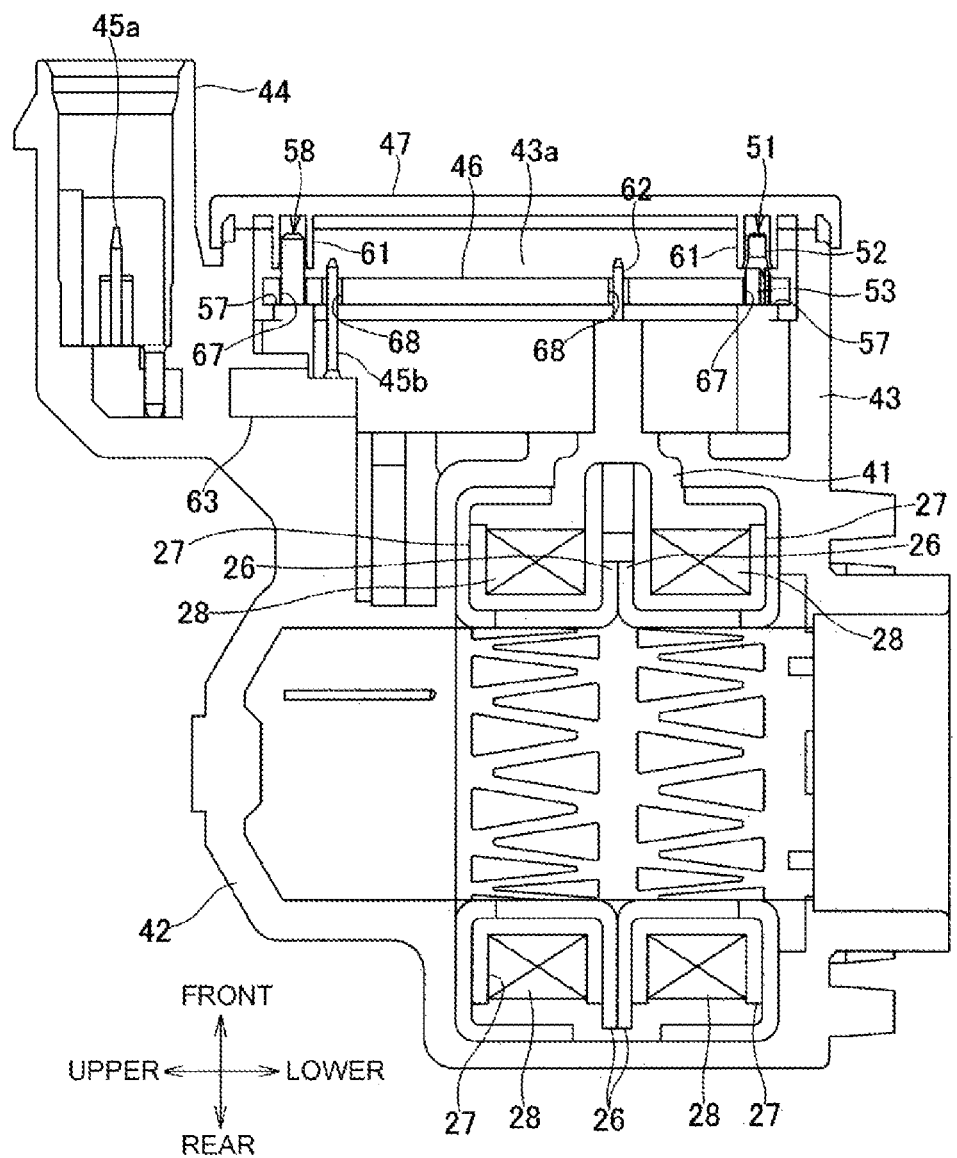
FIG. 19 is a cross sectional view showing the manufacturing step of the electrically operated valve according to the first embodiment, and shows a state in which the lid body is brought into contact with a front edge portion of the case.
Figure 20:
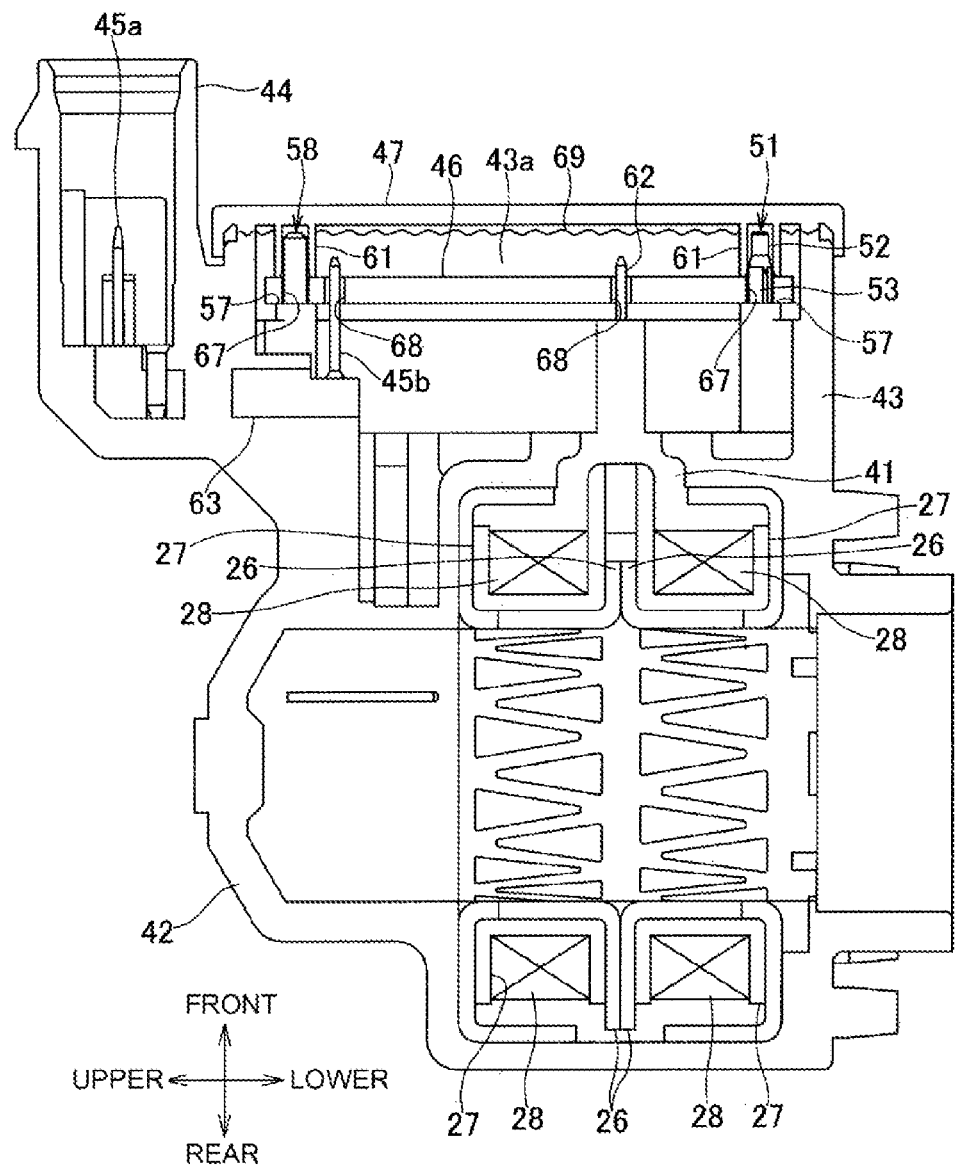
FIG. 20 is a cross sectional view showing the manufacturing step of the electrically operated valve according to the first embodiment, and shows a state in which the attachment of the lid body is finished by welding the lid body to the case.

After the board 46 is arranged within the case 43, the lid body 47 is attached to the case 43. As shown in FIGS. 18 to 19, the lid body 47 is put on the case 43 in such a manner as to close the front opening, and the peripheral edge portion of the back surface in the lid body is brought into contact with the front edge portion of the case 43. In this state, the lid body 47 is pressed against the bottom surface of the case 43 while irradiating an infrared light onto a contact surface of both the elements (front edge portion of the case and the peripheral edge portion of the lid body) and welding the contact surface between the case 43 and the lid body 47. The lid body 47 progresses toward the bottom surface of the case 43 accompanied with the welding of the contact surface. However, when the pressing projection 61 in the back surface of the lid body runs into the surface (front surface) of the board 46 as shown in FIG. 20, the lid body 47 does not progress any more. Further, when the welding is finished in this state, the board 46 is firmly supported within the case 43 in a state in which the board is held by the step portion 57 and the pressing projection 61. The weld surface of the lid body 47 and the case 43 is denoted by reference numeral 69 in FIG. 20.

As described above, according to the present embodiment, it is possible to install the board 46 into the case 43 and attach the lid body 47 only by a comparatively simple operation of pressing the board 46 toward the bottom surface of the case 43 and welding the lid body 47. Further, the welding depth of the case 43 and the lid body 47 (how far the case 43 and the lid body 47 is welded in the vertical direction (longitudinal direction)) can be set by the height (length in the longitudinal direction) of the pressing projection. Therefore, according to the present embodiment, it is possible to prevent the airtightness of the case 43 from being insufficient due to insufficient welding depth or prevent an excessive welding from being generated, by setting the height of the pressing projection 61 appropriately. As a result, it is possible to keep a welding quality of the case 43 fixed or good when mass producing the electrically operated valve 11. Further, the joining work of the lid body 47 can be evenly finished by the contact of the pressing projection 61 with the surface of the board 46. Therefore, it is possible to efficiently perform the attaching work of the lid body 47.

Figure 21:
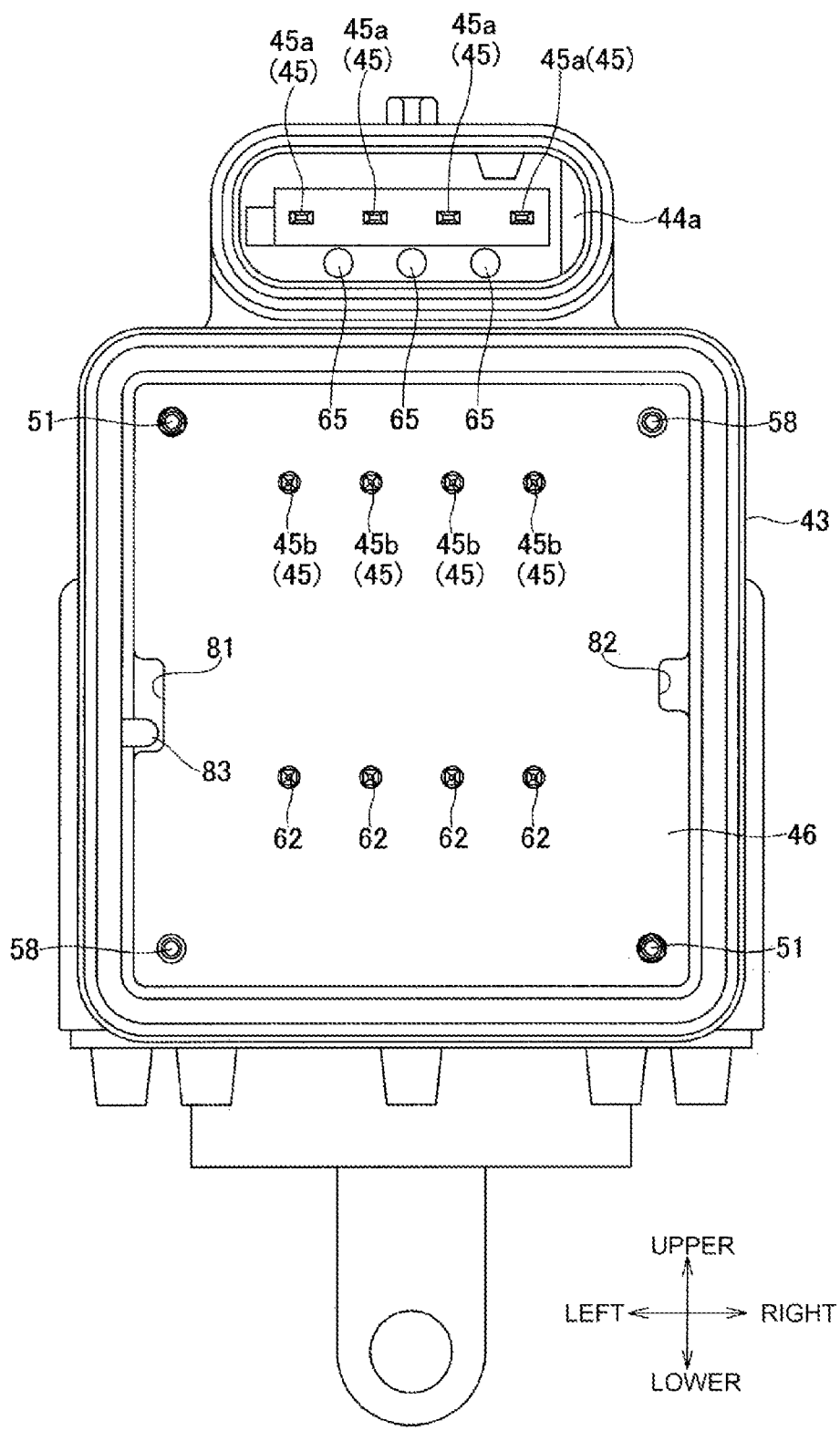
FIG. 21 is a cross sectional view showing the manufacturing step of the electrically operated valve according to the first embodiment, and shows a state before attaching the lid body to the case.
Figure 22:
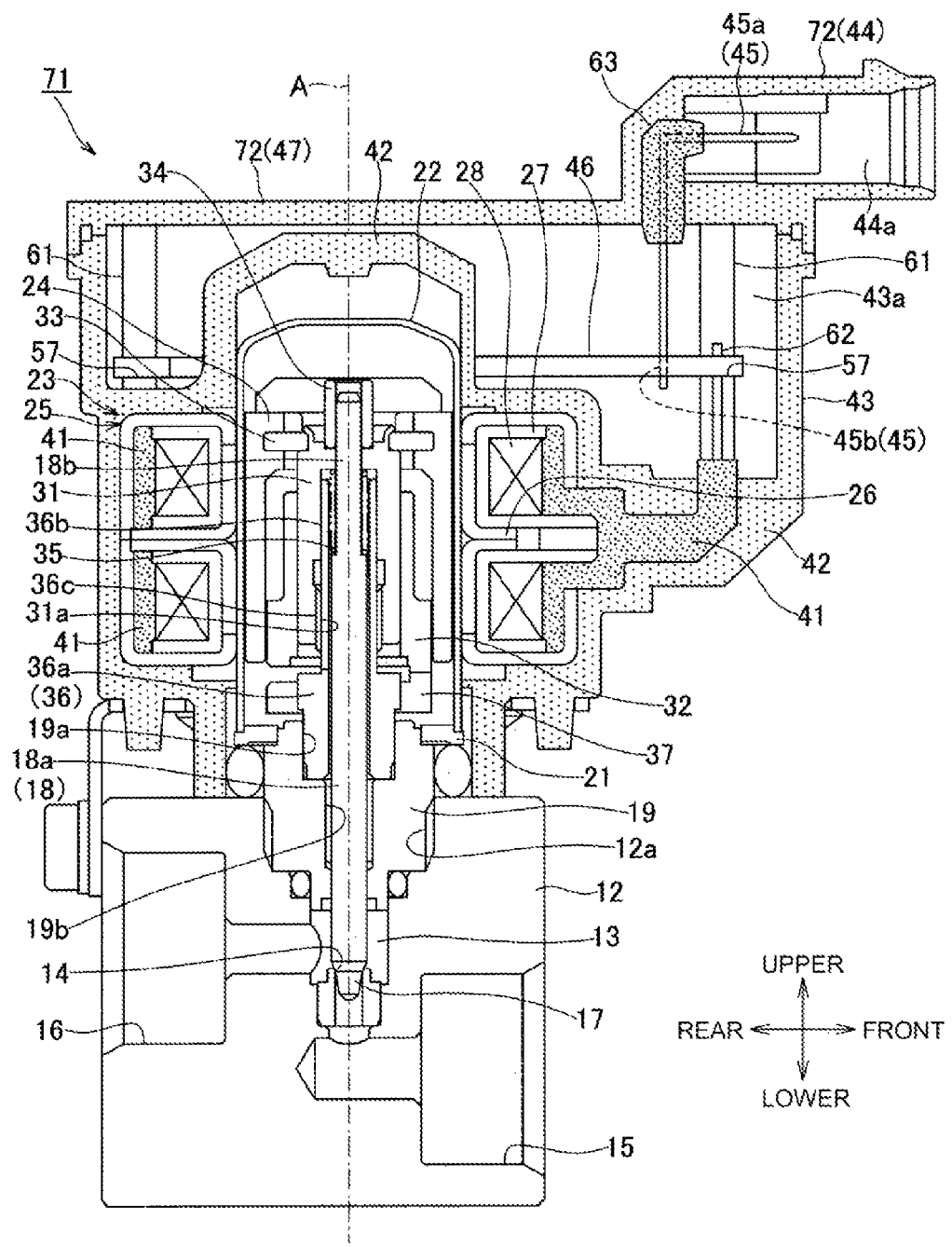
FIG. 22 is a vertical cross sectional view showing a valve close state of an electrically operated valve according to a second embodiment of the present invention.
Figure 23:
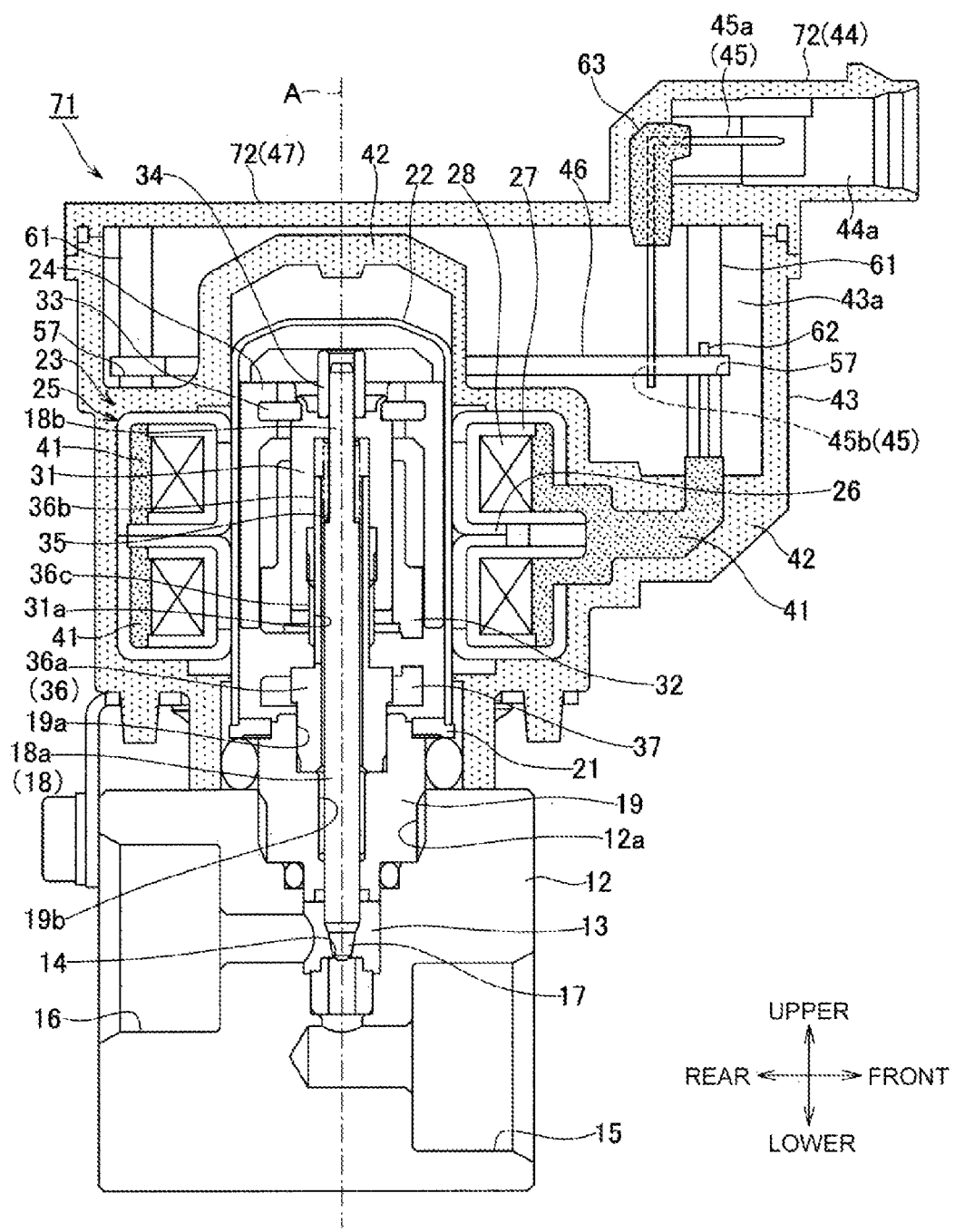
FIG. 23 is a vertical cross sectional view showing a valve open state of the electrically operated valve according to the second embodiment.
Figure 24:
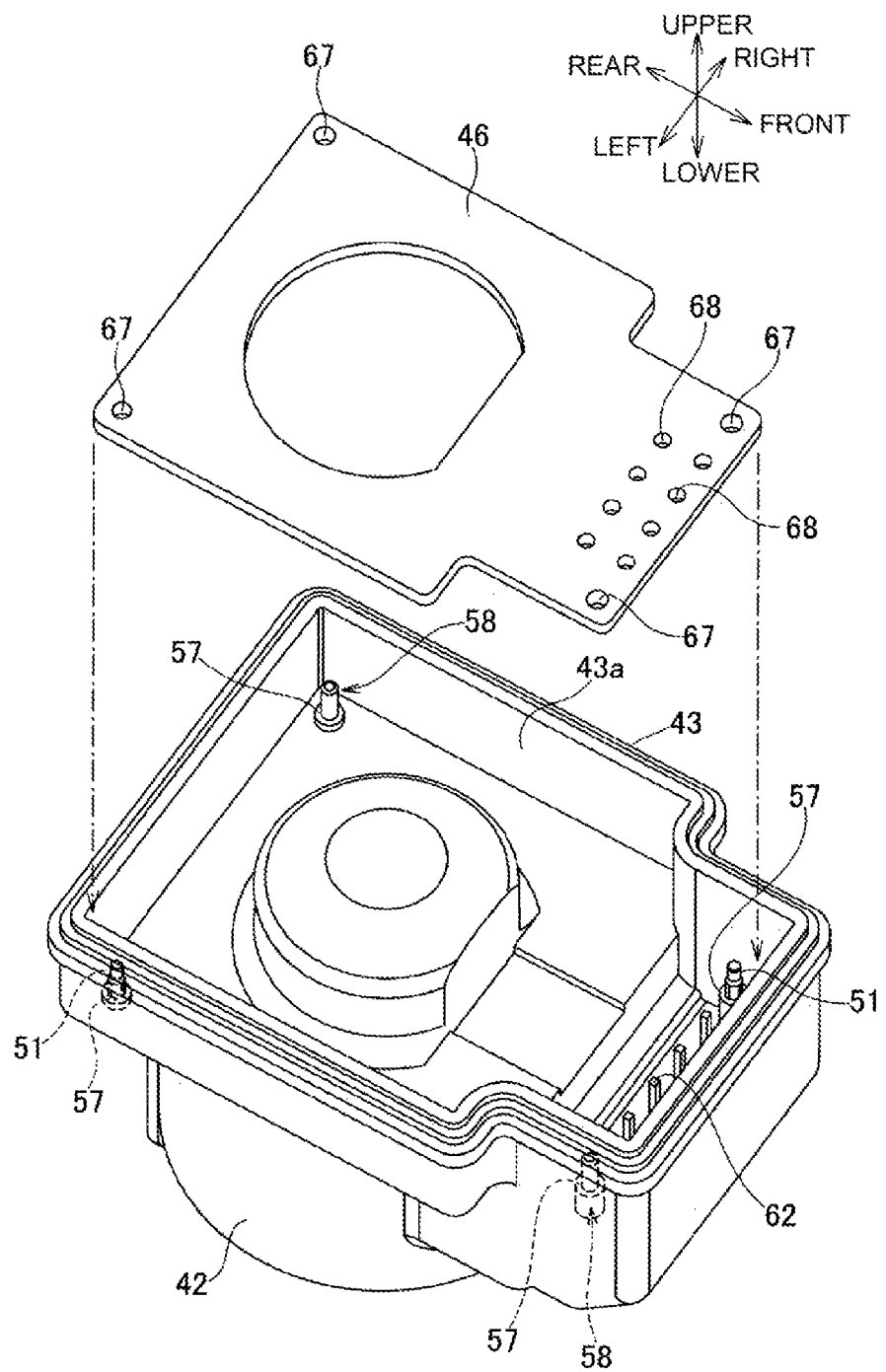
FIG. 24 is a perspective view showing a manufacturing step of the electrically operated valve according to the second embodiment, and shows a state before attaching a board within a case.
Figure 25:
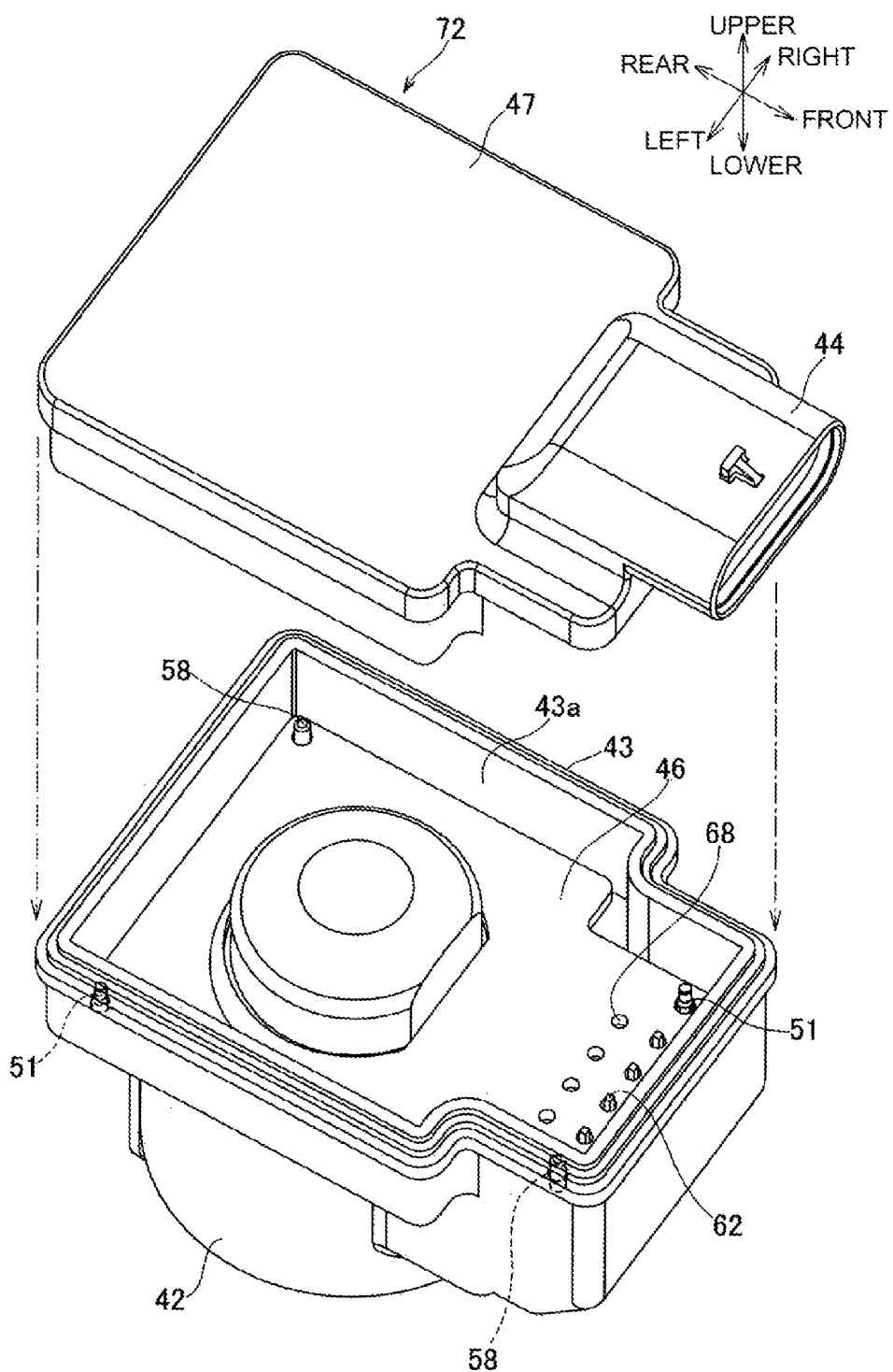
FIG. 25 is a perspective view showing the manufacturing step of the electrically operated valve according to the second embodiment, and shows a state in which the board is attached within the case.
Figure 26:
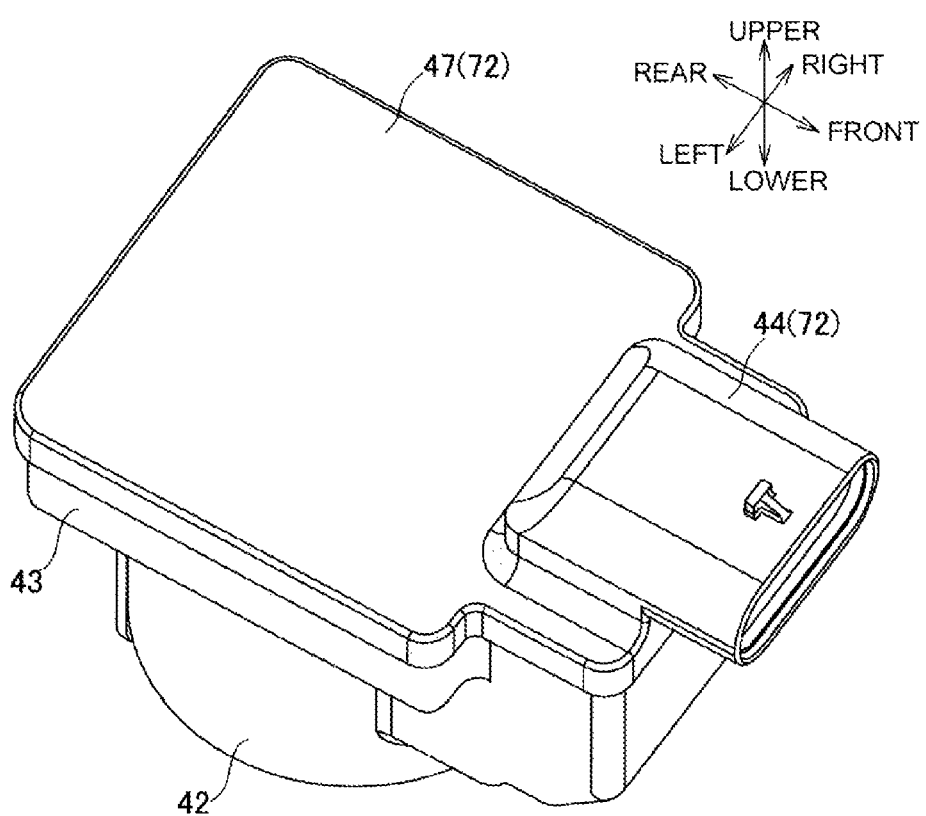
FIG. 26 is a perspective view showing the manufacturing step of the electrically operated valve according to the second embodiment, and shows a state in which a lid body is attached to the case.

Further, FIG. 21 shows a structure which prevents the board 46 from being erroneously attached. As shown in FIG. 21, in the present embodiment, notch portions 81 and 82 having different shapes are respectively formed in a left edge portion and a right edge portion of the board 46, and a projection 83 fitted to one notch portion (wide notch portion in the left side in the present embodiment) 81 when arranging the board 46 correctly is formed in the internal portion of the case 43. In a case where the board 46 is arranged inside out, the narrower notch portion 82 in the right side of FIG. 21 comes to the left side, and the projection 83 can not be fitted to the notch portion 82. As a result, it is possible to immediately know that the board 46 is inside out. Thus, it is possible to prevent the board 46 from being erroneously arranged inside out when attaching the board.

Second Embodiment

A description will be given of an electrically operated valve according to a second embodiment of the present invention with reference to FIGS. 22 to 26. In the following description, same reference numerals are attached to the same structures as those of the electrically operated valve 11 according to the first embodiment, a redundant description will be omitted, and the description will be given mainly of different points.

As shown in FIGS. 22 to 26, an electrically operated valve 71 according to the present embodiment is adapted to move the valve body 17 upward and downward by the electric motor (stepping motor) 23 to regulate the flow rate of the refrigerant in the same manner as the electrically operated valve 11 according to the first embodiment, and is provided with the board 46 which controls the electric motor 23. However, the board 46 is arranged in the upper surface portion of the electric motor 23 (stator 25) so as to horizontally extend, and the case 43 storing the board 46 is formed in the upper surface portion of the electric motor 23.

Figure 7:
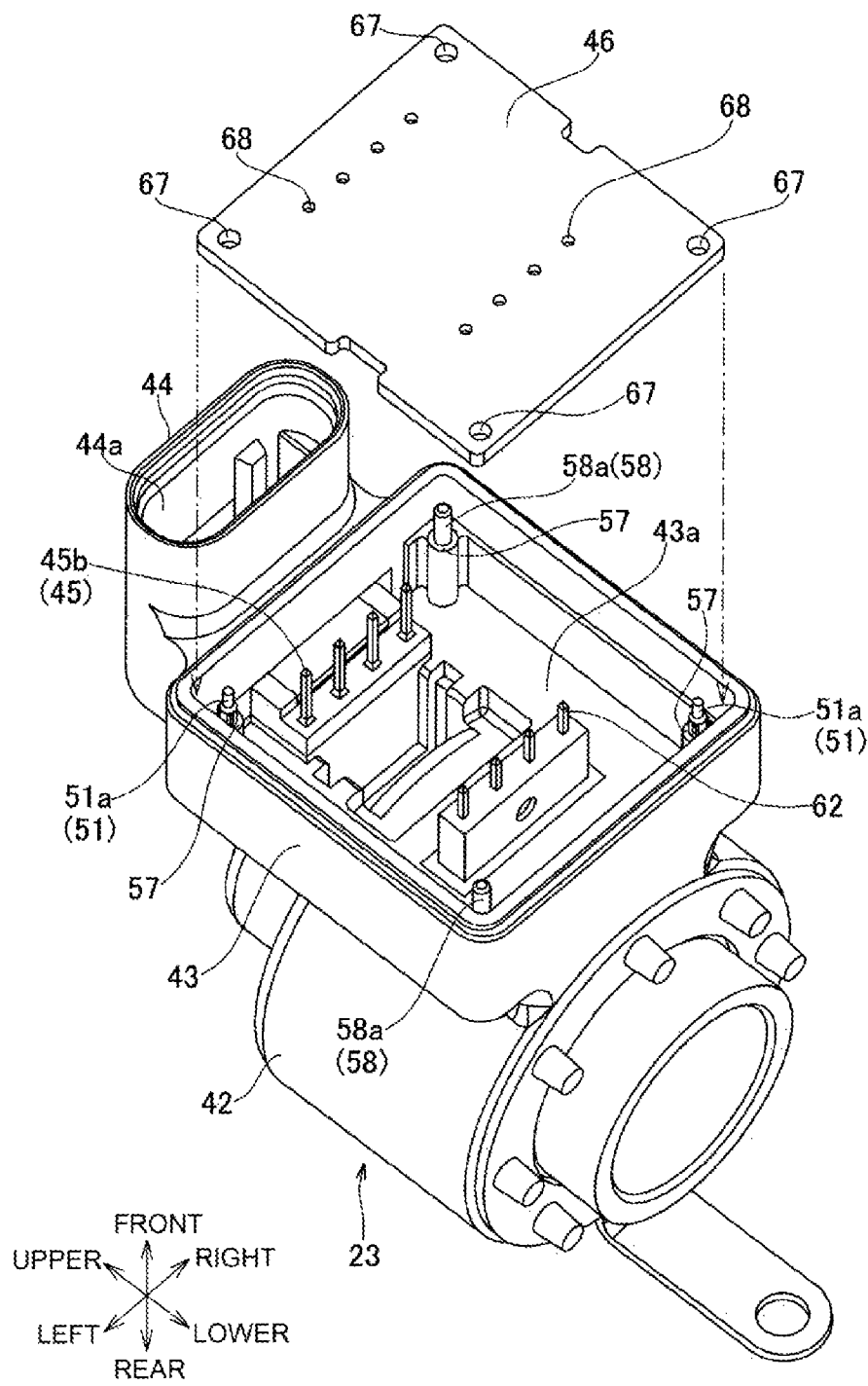
FIG. 7 is a perspective view showing the manufacturing step of the electrically operated valve according to the first embodiment, and shows a state before the board is attached within the case.
Figure 8:
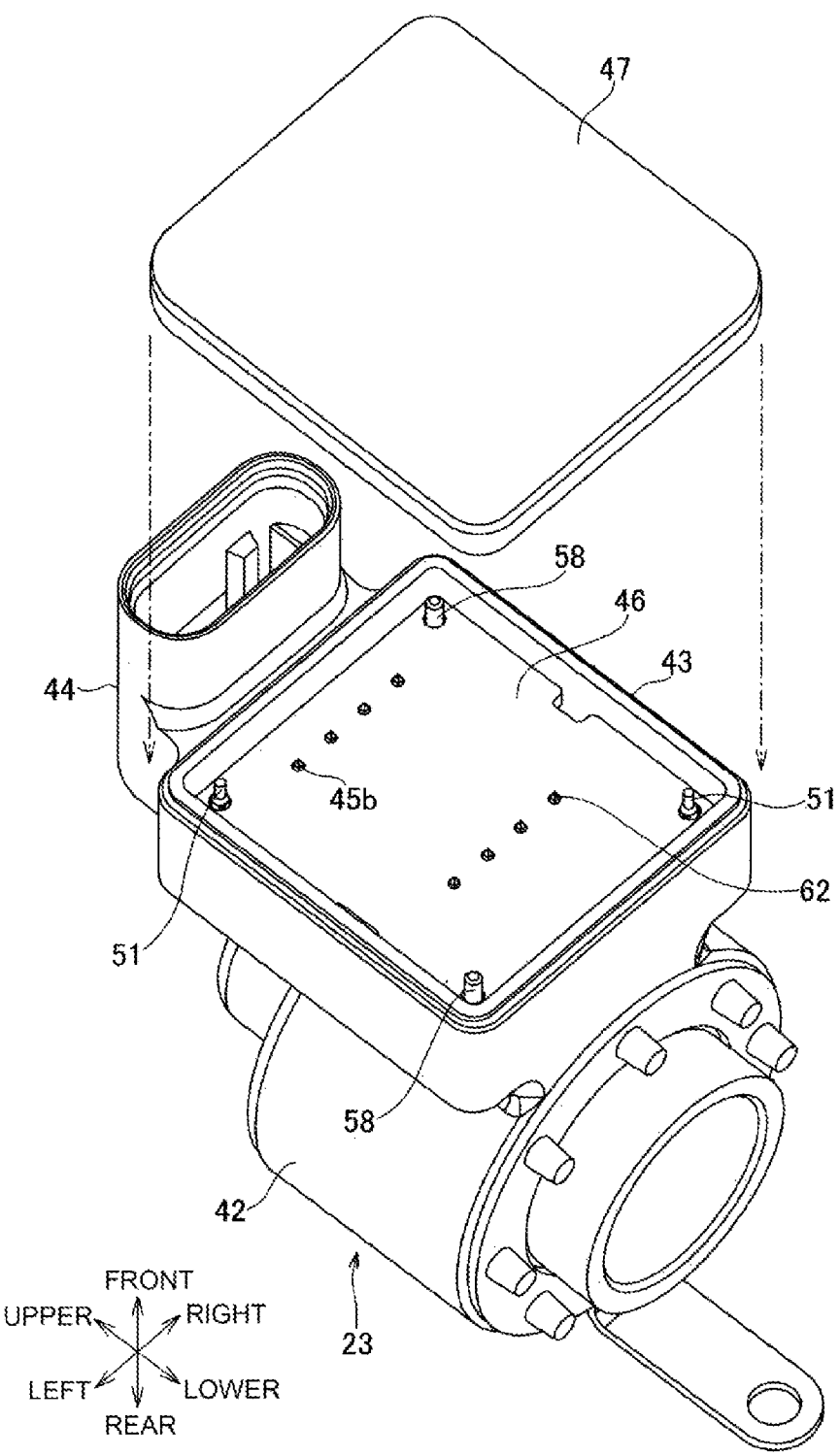
FIG. 8 is a perspective view showing the manufacturing step of the electrically operated valve according to the first embodiment, and shows a state in which the board is attached within the case.
Figure 9:
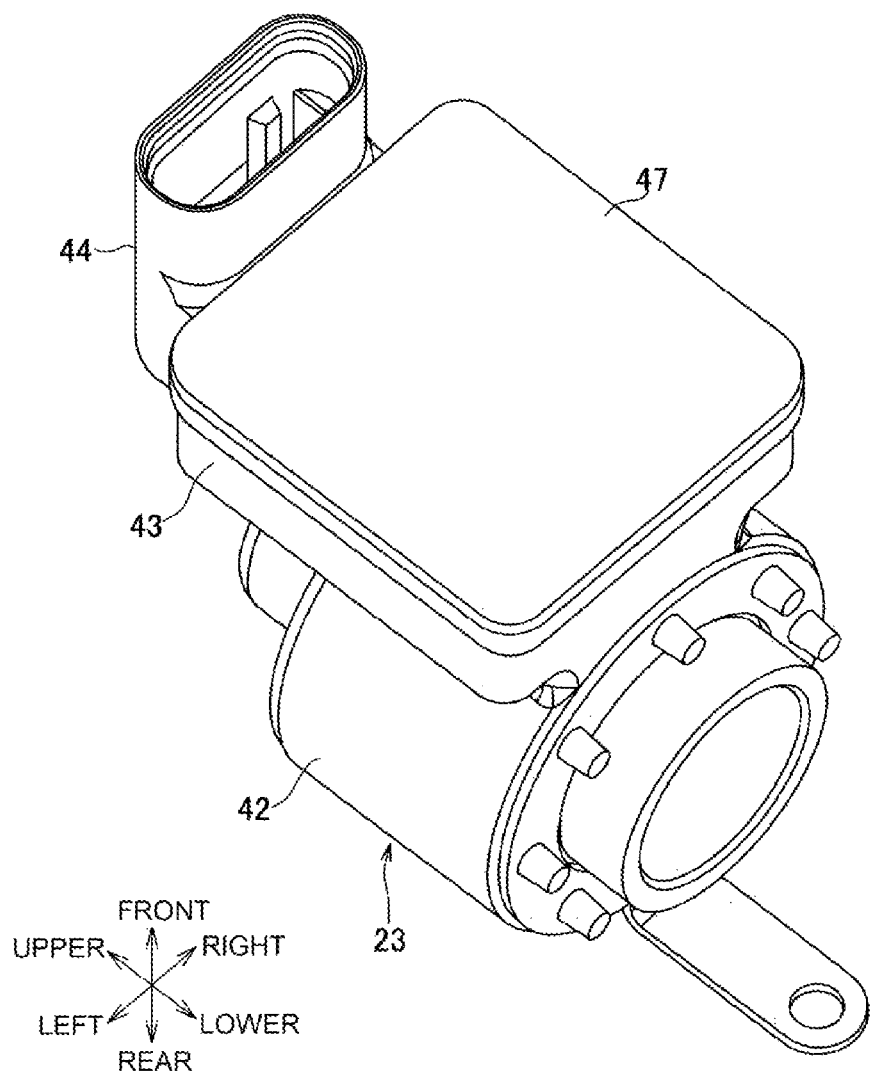
FIG. 9 is a perspective view showing the manufacturing step of the electrically operated valve according to the first embodiment, and shows a state in which the lid body is welded to the case.

The present embodiment is provided with the outer shell cover 42 (to which a rough dot pattern is applied to a cross section in FIGS. 7 and 8) which covers the stator 25 of the electric motor 23 and the can 22, and the coil cover 41 (to which a fine dot pattern is applied to a cross section in FIGS. 7 and 8) which is arranged in the inner side of the outer shell cover 42 and covers the coil 28 in the same manner as the electrically operated valve 11 according to the first embodiment. However, as is different from the electrically operated valve 11 according to the first embodiment, the connector 44 is not integrally formed with the outer shell cover 42, but is formed as a lid body with connect or (lid body forming portion with connector portion) 72 in a different step and is integrally formed with the lid body 47 which occludes the upper opening of the case 43.

The lid body 72 with connector is manufactured via two stages of forming steps. First of all, a first step (primary molding) forms the terminal cover (terminal coating forming portion) 63 which covers and supports the intermediate portion of the external portion connecting terminal 45 and is made of resin, and a successive second step (secondary molding) integrally forms the connector 44 and the lid body 47 as the lid body 72 with connector in such a manner that the terminal cover 63 is covered, and the terminal cover 63 is supported between the connector 44 and the lid body 47, in other words, such that one end portion of the terminal cover 63 protrudes to the connector internal portion 44a, and the other end portion of the terminal cover 63 protrudes downward from the lower surface of the lid body 47.

The lid body 72 with connector is welded to the upper edge portion of the case 43 in such a manner as to occlude the upper opening of the case 43 after installing the board 46 in the case internal portion 43a. The electrical connection between the external portion connecting terminal 45 and the board 46 may be achieved by a press fit connection. More specifically, with the use of the base end portion (end portion in the board side) 45a of the eternal portion connecting terminal 45 as a press fit pin, the press-fit pin is adapted to be pressed in the through hole 68 of the board 46 when putting the lid body 72 with connector on the upper surface of the case 43.

The structure for supporting the board 46 to the case 43 is the same as the first embodiment. More specifically, the press-in projection 51 and the loose-fit projection 58 are provided as the support projection in the case 43 side, and the step portion 57 supporting the board 46 from the lower surface side is formed in the bottom surface portion of each of the support projections 51 and 58. The board 46 has the fixing hole 67 to which the support projections 51 and 58 are fitted and inserted. In the meantime, the pressing projection 61 is disposed in the back surface (lower surface) in the lid body 72 with connector side.

When installing the board 46 within the case 43 while fitting and inserting the support projections 51 and 58 to the fixing hole 67 (refer to FIGS. 24 to 25), and thereafter welding the lid body 72 with connector to the upper surface of the case 43 (refer to FIG. 26), the board 46 is controlled by the press-in projection 51 in the movement in the horizontal direction, and is controlled in the movement to the vertical direction by being held by the step portion 57 and the pressing projection 61, thereby being fixed within the case 43.

The invention claimed is:

1. An electrically operated valve, comprising:
a valve main body having a valve chamber communicated with an inflow passage introducing a refrigerant and an outflow passage discharging the refrigerant;
a valve body for changing a flow rate of the refrigerant by moving forward and backward with respect to a valve seat formed within the valve chamber between a valve close state seating on the valve seat and a valve open state separating from the valve seat;
an electric motor for driving the valve body;
a control board for mounting an electronic component controlling the electric motor;
a board storage portion for including a case portion storing the control board; and
an outer shell forming portion covering a stator of the electric motor,
wherein the case portion is integrally formed with the outer shell forming portion,
wherein the control board has a fixing hole which fixes the control board to an inner side of the case portion,
wherein the case portion has in an internal portion thereof a support projection which supports the control board within the case portion by being inserted into the fixing hole,
wherein the support projection is integrally formed with the case portion,
wherein the electrically operated valve comprises one or more press-in type projection pressed in a fixing hole as the support projection, and
wherein the press-in type projection comprises:
a rod-shaped projection main body; and
a protruding portion extending in a length direction of the projection main body and protruding outward from an outer peripheral surface of the projection main body to come into contact with an inner peripheral surface of the fixing hole when the press-in type projection is inserted into the fixing hole.

2. The electrically operated valve according to claim 1, wherein at least a part of the protruding portion is crushed within the fixing hole when the press-in type projection is inserted into the fixing hole, so that the press-in type projection is pressed in the fixing hole.

3. The electrically operated valve according to claim 1, wherein the press-in type projection is provided with two or more protruding portions, and
wherein the two or more protruding portions are arranged radially with respect to a central axis line of the projection main body.

4. The electrically operated valve according to claim 1, wherein a coil coating forming portion covering a coil provided within the stator is disposed in an inner side of the outer shell forming portion.

5. The electrically operated valve according to claim 1, wherein the case portion has an opening which allows the control board to be installed in the internal portion,
wherein the electrically operated valve comprises a lid body which occludes the opening, and
wherein the lid body is fixed to the case portion by melding both the case portion and the lid body in a contact portion between the case portion and the lid body, and the opening is occluded by the lid body.

6. An electrically operated valve, comprising:
a valve main body having a valve chamber communicated with an inflow passage introducing a refrigerant and an outflow passage discharging the refrigerant;
a valve body for changing a flow rate of the refrigerant by moving forward and backward with respect to a valve seat formed within the valve chamber between a valve close state seating on the valve seat and a valve open state separating from the valve seat;
an electric motor for driving the valve body;
a control board for mounting an electronic component controlling the electric motor;
a board storage portion for including a case portion storing the control board; and
an outer shell forming portion for covering a stator of the electric motor,
wherein the control board has a fixing hole which fixes the control board to an inner side of the case portion,
wherein the case portion has in an internal portion thereof a support projection which supports the control board within the case portion by being inserted into the fixing hole,
wherein the support projection is integrally formed with the case portion,
wherein the case portion is integrally formed with the outer shell forming portion,
wherein the case portion has an opening which allows the control board to be installed in the internal portion,
wherein the electrically operated valve is provided with a lid body which occludes the opening,
wherein the support projection is provided with a step portion which comes into contact with a back surface of the control board when slotting the control board in the case portion while inserting the support projection into the fixing hole so as to stop the progress of the control board toward a direction of a bottom surface of the case portion,
wherein the lid body is provided in an inner surface thereof with a pressing projection which comes into contact with a surface of the control board when occluding the opening, and
wherein the control board is held between the step portion and the pressing projection.

7. The electrically operated valve according to claim 6, wherein the pressing projection is disposed so as to face to the support projection, has a tubular shape which allows a leading end portion of the support projection protruding out of the board to be stored, and comes into contact with a surface of the board around the fixing hole.

8. The electrically operated valve according to claim 6, wherein a coil coating forming portion covering a coil provided within the stator is disposed in an inner side of the outer shell forming portion.

9. The electrically operated valve according to claim 6, wherein the case portion has an opening which allows the control board to be installed in the internal portion,
wherein the electrically operated valve comprises a lid body which occludes the opening, and
wherein the lid body is fixed to the case portion by melding both the case portion and the lid body in a contact portion between the case portion and the lid body, and the opening is occluded by the lid body.

10. An electrically operated valve, comprising:
a valve main body having a valve chamber communicated with an inflow passage introducing a refrigerant and an outflow passage discharging the refrigerant;
a valve body for changing a flow rate of the refrigerant by moving forward and backward with respect to a valve seat formed within the valve chamber between a valve close state seating on the valve seat and a valve open state separating from the valve seat;
an electric motor for driving the valve body;
a control board for mounting an electronic component controlling the electric motor;
a board storage portion for including a case portion storing the control board; and
an outer shell forming portion for mounting a stator of the electric motor,
wherein the case portion is integrally formed with the outer shell forming portion,
wherein the control board has two or more fixing holes to fix the control board to an inner side of the case portion,
wherein the case portion has in an internal portion thereof two or more support projections which support the control board within the case portion by being inserted into the fixing holes so as to correspond to the two or more of fixing holes,
wherein the two or more support projections are integrally formed with the case portion,
wherein the two or more support projections comprise:
a press-in type projection which is pressed in the fixing hole; and
a loose-fit type projection which has a gap with respect to the inner peripheral surface of the fixing hole and is inserted into the fixing hole.

11. The electrically operated valve according to claim 10, wherein a coil coating forming portion covering a coil provided within the stator is disposed in an inner side of the outer shell forming portion.

12. The electrically operated valve according to claim 10, wherein the case portion has an opening which allows the control board to be installed in the internal portion,
wherein the electrically operated valve comprises a lid body which occludes the opening, and
wherein the lid body is fixed to the case portion by melding both the case portion and the lid body in a contact portion between the case portion and the lid body, and the opening is occluded by the lid body.

13. An electrically operated valve, comprising:
a valve main body having a valve chamber communicated with an inflow passage introducing a refrigerant and an outflow passage discharging the refrigerant;
a valve body for changing a flow rate of the refrigerant by moving forward and backward with respect to a valve seat formed within the valve chamber between a valve close state seating on the valve seat and a valve open state separating from the valve seat;
an electric motor for driving the valve body;
a control board for mounting an electronic component controlling the electric motor;
a board storage portion for including a case portion storing the control board; and
an outer shell forming portion for covering a stator of the electric motor,
wherein the case portion is integrally formed with the outer shell forming portion,
wherein the control board has a fixing hole for fixing the control board to an inner side of the case portion,
wherein the case portion comprises in an internal portion thereof:
a support projection for supporting the control board within the case portion by being inserted into the fixing hole, and
a terminal for performing an electrical connection to the control board, and
wherein the support projection is integrally formed with the case portion, and has a height which is higher than a height of the terminal.

14. The electrically operated valve according to claim 13, wherein a coil coating forming portion covering a coil provided within the stator is disposed in an inner side of the outer shell forming portion.

15. The electrically operated valve according to claim 13, wherein the case portion has an opening which allows the control board to be installed in the internal portion,
wherein the electrically operated valve comprises a lid body which occludes the opening, and
wherein the lid body is fixed to the case portion by melding both the case portion and the lid body in a contact portion between the case portion and the lid body, and the opening is occluded by the lid body.

16. An electrically operated valve comprising:
a valve main body having a valve chamber communicated with an inflow passage introducing a refrigerant and an outflow passage discharging the refrigerant;
a valve body for changing a flow rate of the refrigerant by moving forward and backward with respect to a valve seat formed within the valve chamber between a valve close state seating on the valve seat and a valve open state separating from the valve seat:
an electric motor for driving the valve body;
a control board for mounting an electronic component controlling the electric motor;
a board storage portion for including a case portion storing the control board; and
an outer shell forming portion for covering a stator of the electric motor,
wherein the control board has a fixing hole to fix the control board to an inner side of the case portion,
wherein the case portion has in an internal portion thereof a support projection supporting the control board within the case portion by being inserted into the fixing hole,
wherein the support projection is integrally formed with the case portion,
wherein the case portion is integrally formed with the outer shell forming portion,
wherein the case portion has an opening which allows the control board to be installed in the internal portion,
wherein the electrically operated valve comprises:
a lid body for occluding the opening;

a connector portion including an external portion connecting terminal to allow the electrical connection to the external portion; and a terminal coating forming portion for covering an intermediate portion of the external portion connecting terminal and supporting the external portion connecting terminal to the connector portion, wherein the connector portion and the lid body are integrally formed in such a manner as to cover and support the terminal coating forming portion, and wherein a coil coating forming portion covering a coil provided within the stator is disposed in an inner side of the outer shell forming portion.

17. The electrically operated valve according to claim 16, wherein the coil coating forming portion is provided with a concavo-convex portion for positioning the coil coating forming portion within the outer shell forming portion.

18. The electrically operated valve according to claim 16, further comprising a connector portion for enabling an electrical connection with the external portion by supporting the external portion connecting terminal to an internal portion thereof, wherein the connector portion is integrally formed with the outer shell forming portion and the case portion.

* * * * *